United States Patent
Cavalcanti Alem et al.

(10) Patent No.: US 10,715,568 B2
(45) Date of Patent: *Jul. 14, 2020

(54) SYSTEMS AND METHODS FOR OPTIMIZING SIMULCAST STREAMS IN GROUP VIDEO CALLS

(71) Applicant: Facebook, Inc., Menlo Park, CA (US)

(72) Inventors: Arthur Cavalcanti Alem, Redwood City, CA (US); Bret Lorimore, Seattle, WA (US); Shyam Sadhwani, Bellevue, WA (US); Chi Wang Ho, Redmond, WA (US)

(73) Assignee: Facebook, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/503,010

(22) Filed: Jul. 3, 2019

(65) Prior Publication Data

US 2020/0007597 A1    Jan. 2, 2020

Related U.S. Application Data

(63) Continuation of application No. 15/885,696, filed on Jan. 31, 2018, now Pat. No. 10,389,772.

(51) Int. Cl.
*H04L 29/06* (2006.01)
*H04N 7/14* (2006.01)
*H04N 7/15* (2006.01)

(52) U.S. Cl.
CPC ........ *H04L 65/403* (2013.01); *H04L 65/1083* (2013.01); *H04L 65/60* (2013.01); *H04L 65/602* (2013.01); *H04L 65/80* (2013.01); *H04N 7/147* (2013.01); *H04N 7/152* (2013.01)

(58) Field of Classification Search
CPC ........ H04L 65/403; H04L 65/60; H04N 7/147
See application file for complete search history.

(56) References Cited

U.S. PATENT DOCUMENTS

| | | | |
|---|---|---|---|
| 10,389,772 B1 * | 8/2019 | Cavalcanti Alem | H04L 65/60 |
| 2013/0208075 A1 * | 8/2013 | Lu | H04N 7/147 348/14.02 |
| 2014/0028785 A1 * | 1/2014 | Valentine | H04N 7/152 348/14.08 |

* cited by examiner

*Primary Examiner* — Stella L. Woo
(74) *Attorney, Agent, or Firm* — Sheppard Mullin Richter & Hampton LLP

(57) ABSTRACT

Systems, methods, and non-transitory computer-readable media can identify a set of participants in a group video call, wherein each participant is associated with an uplink capacity and a downlink capacity, and the set of participants includes a set of sender participants and a set of subscriber participants. For a first sender participant of the set of sender participants, one or more video stream layers to be uploaded by the first sender participant are determined based on downlink capacities of one or more subscriber participants of the set of subscriber participants. Each subscriber participant of the one or more subscriber participants is assigned to receive one video stream layer of the one or more video stream layers to be uploaded by the first sender participant.

20 Claims, 23 Drawing Sheets

500 identify a set of participants in a group video call, wherein each participant is associated with an uplink capacity and a downlink capacity, and the set of participants includes a set of sender participants and a set of subscriber participants
502

For each sender participant of the set of sender participants, determine one or more video stream layers to be uploaded by the sender participant based on downlink capacities of subscriber participants subscribed to the sender participant
504

For each subscriber participant of the set of subscriber participants, assign the subscriber participant to receive one video stream layer of the one or more video stream layers to be uploaded by each sender participant to which the subscriber participant is subscribed
506

```
200

202  // Output = <Layers+uplinks per sender, Layer subscription remapping for receivers>
203  <Output> SimulcastBWE(vector<Uplink, Downlink, Layer_subscriptions> endpoints) {
204    sort Endpoints by Uplink ascending;
205    foreach (Endpoint sender in Endpoints) {
206      vector<Endpoint, Downlink> dedicated_downlinks;
207      foreach (Endpoint subscriber in Endpoints) {
208        if (subscriber == sender) continue;
209        dedicated_downlinks.push_back(<subscriber, ComputeReservedDownlink(subscriber,
210  sender)>);
211      }
212      sort dedicated_downlinks by Downlink ascending;
213      int prev_layer_kbps = 0.001;
214      int current_layer_to_upload = 0;
215      foreach (<downlink, subscriber> in dedicated_downlinks) {
216        int current_layer_kbps = min(downlink, sender.RemainingUplink);
217        if current_layer_kbps / prev_layer_kbps >= 2: // customizable
218          current_layer_to_upload++;
219          sender.ShouldUploadLayer(current_layer_to_upload, current_layer_kbps);
220          sender.RemainingUplink -= current_layer_kbps;
221        else:
222          current_layer_kbps = prev_layer_kbps; // reuses same layer
223          // optional customizable enhancement to maximize uplink usage:
224          // if RemainingUplink >= prev_layer_kbps && downlink >= RemainingUplink*2
225          //   RemainingUplink += prev_layer_kbps;
226          //   sender.ShouldUploadLayer(current_layer_to_upload, RemainingUplink * 0.25);
227          //   current_layer_to_upload++;
228          //   sender.ShouldUploadLayer(current_layer_to_upload, RemainingUplink * 0.75);
229          //   RemainingUplink = 0; // PS: also needs to check current_layer_to_upload-1
230        subscriber.RemapLayerSubscription(sender, current_layer_to_upload);
231      }
232      foreach (<downlink, subscriber> in dedicated_downlinks) {
233        int unused_downlink = downlink -
234  sender.LayerUplink(subscriber.RemappedLayerSubscribedFrom(sender));
235        subscriber.RemainingDownlink += unused_downlink;
236      }
237    }
238  }
```

```
302  int ComputeReservedDownlink(Endpoint subscriber, Endpoint sender) {
303     int reserved_downlink;
304     HD_RATIO = 0.5; // customizable, e.g.: 4 / (3 + subscriber.RemainingSubscriptions)
305     if subscriber wants layer 2 from sender: // (MD/gridview)
306        reserved_downlink = subscriber.RemainingDownlink / subscriber.RemainingSubscriptions;
307     if subscriber wants layer >=3 from sender: // (HD/fullscreen)
308        reserved_downlink = subscriber.RemainingDownlink * HD_RATIO;
309     if subscriber wants layer 1 from sender: // (LD/thumbnail)
310        if subscriber still has pending unfulfilled HD layer subscription:
311           reserved_downlink = subscriber.RemainingDownlink * (1.0 - HD_RATIO) /
312  (subscriber.RemainingSubscriptions-1);
313        else if HD layer is already accounted for:
314           reserved_downlink = subscriber.RemainingDownlink /
315  subscriber.RemainingSubscriptions;
316
317     subscriber.RemainingDownlink -= reserved_downlink;
318     subscriber.RemainingSubscriptions--;
319     return reserved_downlink;
320  }
```

FIGURE 3

User404 100d → create Layer1 = 100u, 100u left over
User406 200d → not enough uplink left for a new layer, downgrade Layer1 to 50u and create Layer2 = 150u
User408 500d → insufficient remaining uplink for new layer, assign to Layer 2 (150u))

User402 66d → create Layer1 = 66u, 234u left over
User406 225d → create Layer2 = 225u, 9u left over
User408 425d → insufficient uplink remaining for new layer, assign to Layer 2 (225u))

User402 67d → create Layer1 = 67u, 283u left over
User404 75d → not sufficiently distinct from Layer1, assign to Layer1 (67)
User408 625d → create Layer2 = 283u, 0u left over

500

Identify a set of participants in a group video call, wherein each participant is associated with an uplink capacity and a downlink capacity, and the set of participants includes a set of sender participants and a set of subscriber participants
502

For each sender participant of the set of sender participants, determine one or more video stream layers to be uploaded by the sender participant based on downlink capacities of subscriber participants subscribed to the sender participant
504

For each subscriber participant of the set of subscriber participants, assign the subscriber participant to receive one video stream layer of the one or more video stream layers to be uploaded by each sender participant to which the subscriber participant is subscribed
506

FIGURE 5

SYSTEMS AND METHODS FOR OPTIMIZING SIMULCAST STREAMS IN GROUP VIDEO CALLS

CROSS-REFERENCE TO RELATED APPLICATIONS

This application is a continuation of U.S. patent application Ser. No. 15/885,696, filed on Jan. 31, 2018 and entitled "SYSTEMS AND METHODS FOR OPTIMIZING SIMULCAST STREAMS IN GROUP VIDEO CALLS", which is incorporated herein by reference in its entirety.

FIELD OF THE INVENTION

The present technology relates to the field of digital communications. More particularly, the present technology relates to techniques for optimizing simulcast streams in group video calls.

BACKGROUND

Today, people often utilize computing devices for a wide variety of purposes. Users can use their computing devices, for example, to communicate with other users. Such communications are increasingly popular over a social networking system. Digital communications, such as those on a social networking system, may involve various types of communication. Some types of digital communication allow a user to engage in focused exchanges. For example, the user may target a particular user or users through the use of a messaging system or an email system supported by a social networking system. As another example, the user can enter into audio communications or video communications with other users.

In many instances, video communications can be preferred by users because video communications can allow the users to most effectively convey information and simulate real life communications. In some instances, two participants in different locations can engage in video communications. It also can be desirable to allow a group of users in multiple locations to use video communications to facilitate communications among the group.

SUMMARY

Various embodiments of the present disclosure can include systems, methods, and non-transitory computer readable media configured to identify a set of participants in a group video call, wherein each participant is associated with an uplink capacity and a downlink capacity, and the set of participants includes a set of sender participants and a set of subscriber participants. For a first sender participant of the set of sender participants, one or more video stream layers to be uploaded by the first sender participant are determined based on downlink capacities of one or more subscriber participants of the set of subscriber participants. Each subscriber participant of the one or more subscriber participants is assigned to receive one video stream layer of the one or more video stream layers to be uploaded by the first sender participant.

In an embodiment, the one or more video stream layers to be uploaded by the first sender participant are determined based on downlink capacities of subscriber participants subscribed to the first sender participant.

In an embodiment, each subscriber participant is subscribed to at least one sender participant.

In an embodiment, each video stream layer to be uploaded by the first sender participant is associated with a bitrate.

In an embodiment, a bitrate is determined for each video stream to be uploaded by the first sender participant based on downlink capacities of subscriber participants subscribed to the first sender participant and the uplink capacity associated with the first sender participant.

In an embodiment, the set of sender participants are ranked based on uplink capacity.

In an embodiment, the determining for a first sender participant of the set of sender participants one or more video stream layers to be uploaded by the first sender participant further comprises determining, for each sender participant of the set of sender participants, one or more video stream layers to be uploaded by the sender participants based on downlink capacities of subscriber participants subscribed to the sender participant.

In an embodiment, the determining, for each sender participant of the set of participants, one or more video stream layers to be uploaded by the sender participant comprises iteratively processing each sender participant in an order based on the ranking.

In an embodiment, the iteratively processing each sender participant comprises a plurality of iterations, with each iteration being associated with a particular sender participant of the set of sender participants, and each iteration comprises iteratively processing each subscriber participant subscribed to the particular sender participant associated with the iteration.

In an embodiment, the iteratively processing each subscriber participant subscribed to the particular sender participant comprises determining, for each subscriber participant, whether to create a new layer to be uploaded by the particular sender participant or assigning the subscriber participant to a previously created layer associated with the particular sender participant.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 2 illustrates example pseudocode associated with automated bandwidth allocation, according to an embodiment of the present disclosure.

FIG. 3 illustrates example pseudocode associated with automated downlink capacity reservation, according to an embodiment of the present disclosure.

FIG. 5 illustrates an example method associated with group video call simulcast optimization, according to an embodiment of the present disclosure.

Figure 1:
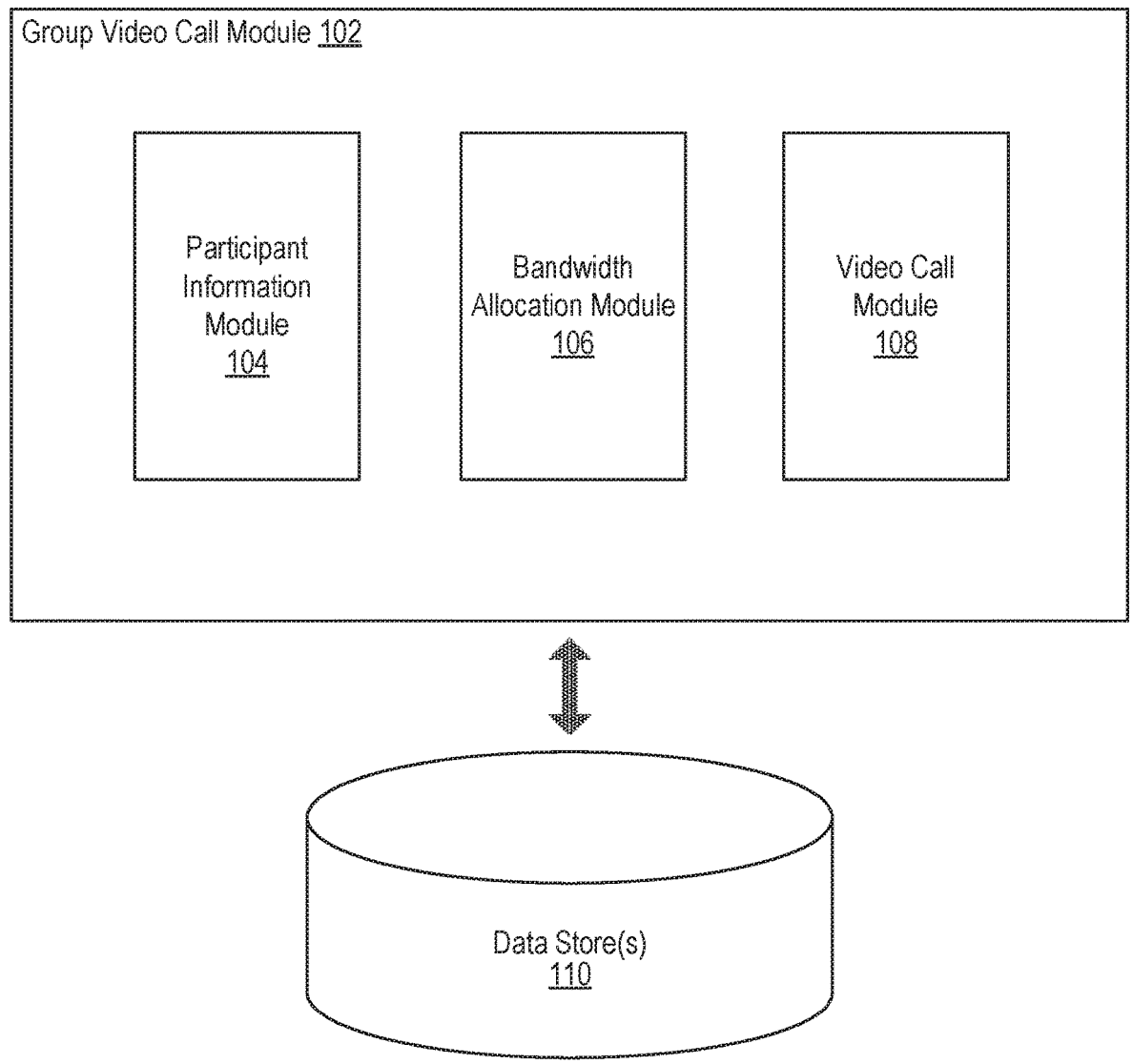
FIG. 1 illustrates an example system including a group video call module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Optimizing Size of Simulcast Strems in Group Video Calls

As mentioned, people often utilize computing devices for a wide variety of purposes. Users can use their computing devices, for example, to communicate with other users. Such communications are increasingly popular over a social networking system. Digital communications, such as those on a social networking system, may involve various types of communication. Some types of digital communication allow a user to engage in focused exchanges. For example, the user may target a particular user or users through the use of a messaging system or an email system supported by a social networking system. As another example, the user can enter into audio communications or video communications with other users.

In many instances, video communications can be preferred by users because video communications can allow the users to most effectively convey information and simulate real life communications. In some instances, two participants in different locations can engage in video communications. It also can be desirable to allow a group of users in multiple locations to use video communications to facilitate communications among the group.

Conventional approaches specifically arising in the realm of computer technology include digital communications in which a plurality of users participate in a group video call. Generally, video streams from one or more participants in a group video call are transmitted to the other participants in substantially real-time. Participants in a group video call may be able to request varying levels of video quality. For example, participants can request a high quality stream, a standard quality stream, or a low quality stream. However, it is possible that a participant may request a video stream of a higher quality than their network connection is optimally suited to provide. For example, a user may request a high quality video stream even if the user's network connection is not optimally suited to provide a high quality video stream. In such scenarios, certain conventional approaches have opted to limit video stream bitrates based on a participant with the lowest available downlink capacity. For example, consider an example scenario in which there are four participants in a group video call. Three of the four participants may request a high quality video stream from the fourth participant. However, a first participant of the three participants has a downlink capacity of 100 kbps, while the second and third participants each have a much greater downlink capacity of 5 Mbps. Under certain conventional approaches, the bitrate and/or quality of the high quality video stream uploaded by the fourth participant may be restricted to be less than 100 kbps so as to accommodate the first participant with the 100 kbps downlink capacity. All three participants requesting the high quality video stream receive the limited high quality video stream due to the first participant's low downlink capacity. This leads to the undesirable outcome that other participants in a group video call may be unnecessarily forced to receive a lower quality video stream even if they are capable of receiving a higher quality video stream and the uploading user is capable of uploading a higher quality video stream. Such approaches could even lead to scenarios in which a "high quality" stream has a lower quality than a "low quality" stream depending on which users have requested which stream. For example, in the above example scenario, if the third participant, who has a 5 Mbps downlink capacity, had requested a low quality video stream, it is possible that the low quality video stream would be of a higher quality than the high quality video stream because the first participant is limiting the high quality video stream.

Other conventional approaches have divided each uploading participant's uplink capacity into pre-determined ratios for video streams of various qualities. For example, a participant's uplink capacity may be divided such that 80% of the uplink capacity is used for a high quality stream, 15% of the uplink capacity is reserved for a medium quality stream, and 5% of the uplink capacity is reserved for a low quality stream. However, this approach fails to account for the particular characteristics of the users that are participating in a group video call. Therefore, such approaches, fail to optimize user experience based on the particular group of participants participating in a group video call.

An improved approach rooted in computer technology overcomes the foregoing and other disadvantages associated with conventional approaches specifically arising in the realm of computer technology. In general, a set of participants participating in a group video call can be identified. For example, the set of participants may be identified by a central server tasked with managing the group video call. Each participant in the set of participants can be associated with an uplink capacity and a downlink capacity. One or more of the participants may be identified as sender participants that will be uploading one or more video streams to be received and viewed by other participants in the group video call. One or more participants may be identified as subscriber participants that will be receiving and viewing at least one video stream uploaded by another participant. A given participant in a group video call may be solely a sender participant, solely a subscriber participant, or both a sender and a subscriber participant. Each sender participant in the set of participants can be instructed to upload one or more video stream layers of varying qualities (e.g., bitrates). The number of video stream layers to be uploaded by a sender participant and a bitrate associated with each video stream layer may be determined based on the uplink capacity of the sender participant and the downlink capacities of other participants in the group video call. This determination may be made, for example, by the central server. For example, the central server may instruct a first participant to upload a first video stream layer having a first quality (e.g., a first bitrate) and a second video stream layer having a second quality (e.g., a second bitrate). The first and second video stream layers, and the first and second bitrates, may be determined based on the first participant's uplink capacity and based on the downlink capacities of other participants in the group video call. Determination of video stream layers and bitrates may be performed iteratively until each sender participant is assigned one or more video stream layers to be uploaded by that sender participant. When the iterations have completed, each sender participant is associated with one or more video stream layers that he or she is responsible for uploading, and each subscriber participant is associated with one video stream layer from each of one or more sender participants that the subscriber participant will receive. In certain embodiments, each participant in a group video call can be communicatively connected to a central server. The central server can be configured to receive video stream layers from one or more sender participants, and to transmit the video stream layers to one or more subscriber participants based on their subscriptions. More details relating to the disclosed technology are provided below.

FIG. 1 illustrates an example system 100 including a group video call module 102, according to an embodiment of the present disclosure. The group video call module 102 can be configured to identify a set of participants participating in a group video call. Each participant in the set of participants can be associated with an uplink capacity and a downlink capacity. One or more of the participants may be identified as sender participants. Sender participants are those participants that will be uploading one or more video streams to be received and viewed by other participants in the group video call. One or more participants may be identified as subscriber participants. Subscriber participants are those participants that have will be receiving and viewing at least one video stream uploaded by another participant. A given participant in a group video call may be solely a sender participant, solely a subscriber participant, or both a sender and a subscriber participant. Subscriber participants can be associated with one or more subscriptions. Each subscription can be associated with a subscriber participant and a sender participant, and a subscription can indicate that the subscriber participant has requested and/or will be receiving a video stream (also referred to herein as a "video stream layer") uploaded by the sender participant. Each subscription may also be associated with a quality setting or quality indicator, indicating a quality of a video stream requested by a subscriber participant. For example, a subscription between a subscriber participant and a sender participant can indicate whether the subscriber participant has requested a high quality video stream layer, a standard quality video stream layer, or a low quality video stream layer from the sender participant.

For each sender participant in the set of participants, the group video call module 102 can determine one or more video stream layers to be uploaded by that sender participant based on the uplink capacity of the sender participant and the downlink capacities of other participants (e.g., subscriber participants) in the group video call. Each video stream layer uploaded by a particular sender participant may have and/or be associated with a particular quality (e.g., a particular bitrate). For example, for a first sender participant in the set of participants, the group video call module 102 can review an uplink capacity of the first sender participant and downlink capacities for each subscriber participant that has subscribed to the first sender participant (e.g., each subscriber participant that will be receiving a video stream from the first sender participant as part of the group video call). Based on these factors, the group video call module 102 can instruct the first sender participant (i.e., a computing device associated with the first sender participant) to upload a first video stream layer having a first quality (e.g., a first bitrate), a second video stream layer having a second quality (e.g., a second bitrate), and so forth. In various embodiments, additional considerations may be taken into account when determining how many streams each sender participant will upload, and at what bitrates. These additional considerations can include, for example, capabilities of a sender participant, such as CPU speed, GPU processing speed, other hardware performance metrics or capabilities, and the like.

The group video call module 102 can iteratively cycle through each sender participant in the group video call and determine video stream layers to be uploaded by each sender participant until such determination has been made for every sender participant in the group video call. In various embodiments, when the iterative processing by the group video call module 102 has completed, each sender participant is associated with one or more video stream layers that he or she is responsible for uploading. Additionally, when the iterative processing has completed, each subscriber participant is associated with one video stream layer from each sender participant to which the subscriber participant is subscribed. For example, consider an example scenario in which there are three participants in a group video call, each participant is a sender participant, and each participant is also subscribed to every other participant. Each participant may be instructed to upload one or more video stream layers, with each video stream layer having a particular bitrate. A first participant may be assigned to receive a particular video stream layer from a second participant and a particular video stream layer from a third participant, the second participant may be assigned to receive a particular video stream layer from the first participant and a particular video stream layer from the third participant, and the third participant may be assigned to receive a particular video stream layer from the first participant and a particular video stream layer from the second participant. Assignment of a subscriber participant to particular video stream layers uploaded by sender participants may be determined based on the subscriber participant's downlink capacity and the sender participants' uplink capacities. The group video call module 102 can be configured to receive video stream layers from each sender participant in a group video call, and to transmit the video stream layers to subscriber participants in the group video call based on assignments of particular subscriber participants to particular video stream layers. In various embodiments, one or more functions of the group video call module 102 can be implemented in a central server. The participants of a group video call can be connected to the central server and can upload video stream layers to the central server and receive from the central server video stream layers uploaded by other participants. Although various embodiments of the present disclosure will describe various concepts with reference to group video calls, it should be understood that the present disclosure may be applied to any exchange of data streams, such as audio data, video data, other media, and the like.

As shown in the example of FIG. 1, the group video call module 102 can include a participant information module 104, a bandwidth allocation module 106, and a video call module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the group video call module 102 can be implemented in any suitable combinations.

In some embodiments, the group video call module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the group video call module 102 can be, in part or in whole, implemented as software running on one or more computing devices or systems, such as on a server system or a client computing device. In some instances, the group video call module 102 can be, in part or in whole, implemented within or configured to operate in conjunction with or be integrated with a social networking system (or service), such as a social networking system 630 of FIG. 6. Likewise, in some instances, the group video call module 102 can be, in part or in whole, implemented within or configured to operate in conjunction with or be integrated with a client computing device, such as the user device 610 of FIG. 6. For example, the group video call module 102 can be implemented as or within a dedicated application (e.g., app), a program, or an applet running on a user computing device or client computing system. The application incorporating or implementing instructions for performing functionality of the group video call module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The group video call module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the group video call module 102. For example, the data store 110 can store various rules for video stream layer creation and/or bandwidth allocation in group video calls, group video call subscription information, user characteristics such as downlink capacity and uplink capacity, and the like. It is contemplated that there can be many variations or other possibilities.

The participant information module 104 can be configured to identify a set of participants participating in a group video call. Each participant can be associated with an uplink capacity and a downlink capacity. The participant information module 104 can be configured to determine the uplink and downlink capacities of each participant or to receive this information from another source.

The participant information module 104 can also be configured to receive subscription information for the participants in a group video call. As discussed, one or more participants in a group video call may be identified as sender participants that will upload one or more video stream layers to be received and viewed by other participants in the group video call. Furthermore, one or more participants in a group video call may be identified as subscriber participants that will receive and view one or more video stream layers uploaded by other participants in the group video call. A given participant may be both a sender participant and a subscriber participant. For example, in a group video call in which every participant is uploading a video stream, and is also viewing video streams of all other participants in the group video call, every participant is both a sender participant and a subscriber participant.

Subscription information received by the participant information module 104 may identify which subscriber participants are subscribed to which sender participants in a group video call. Subscription information may also include quality information indicating a requested quality level for each subscription between a subscriber participant and a sender participant. For example, the quality information may indicate whether the subscriber participant has requested a high quality video stream layer, a standard quality video stream layer, or a low quality video stream layer from a particular sender participant.

In certain embodiments, quality information for a subscription may be input directly by a participant. For example, a subscriber participant may select an option in a user interface which specifies the quality level the subscriber participant would like to receive. In certain embodiments, quality information for a subscription may be inferred. In a particular instance of this embodiment, quality information can be inferred based on a viewing mode of a subscriber participant. For example, if a subscriber participant has a first sender participant in a full-screen view and all remaining sender participants in thumbnail views, it may be inferred that the subscriber participant would like a high quality video stream from the first sender participant, and low quality video streams from the remaining sender participants. In another example, if a subscriber participant has all sender participants in a grid view such that the sender participants are displayed in tiles of substantially equal sizes, it can be inferred that the subscriber participant would like a medium quality video stream from each sender participant. In another instance of this embodiment, quality information can be inferred based on group video call equipment being utilized by a subscriber participant and/or a sender participant. Group video call equipment can include hardware and/or software components. For example, if a subscriber participant is connected to a group video call using high-end dedicated video conferencing equipment, it can be assumed that the subscriber participant would like to receive a highest quality video stream layer available from each sender participant.

The bandwidth allocation module 106 can be configured to determine, for each sender participant in a group video call, one or more video stream layers to be uploaded by the sender participant based on the sender participant's uplink capacity and downlink capacities of other participants in the group video call. The bandwidth allocation module 106 can also be configured to determine a quality level (e.g., a bitrate) for each video stream layer based on the sender participant's uplink capacity and downlink capacities of other participants in the group video call. In certain embodiments, the one or more video stream layers to be uploaded by a sender participant and their respective bitrates may be determined based on the downlink capacities of the subscriber participants that are subscribed to the sender participant.

The bandwidth allocation module 106 can also be configured to assign each subscriber participant in a group video call to receive one video stream layer from each sender participant in the group video call to which the subscriber participant is subscribed. By assigning a subscriber participant to a particular video stream layer uploaded by a sender participant, the bandwidth allocation module 106 determines that the subscriber participant will receive from the sender participant a video stream layer having a particular bitrate.

In various embodiments, the bandwidth allocation module 106 can determine video stream layers to be uploaded by sender participants in a group video call in an iterative fashion. For example, a set of sender participants can be ordered and/or ranked based on ranking criteria, and the bandwidth allocation module 106 can process each sender participant sequentially based on the order. As each sender participant is being processed, the bandwidth allocation module 106 can determine one or more video stream layers to be uploaded by the sender participant as well as quality levels (e.g., bitrates) for each video stream layer, and can assign each subscriber participant that is subscribed to the sender participant to receive a particular video stream layer of the one or more video stream layers. In one embodiment, the bandwidth allocation module 106 can rank the set of sender participants based on uplink capacity in ascending order from lowest uplink capacity to highest uplink capacity. The bandwidth allocation module 106 can sequentially process the sender participants based on the ranking. For example, the bandwidth allocation module 106 can first process a first sender participant having a lowest uplink capacity, and determine one or more video stream layers to be uploaded by the first sender participant and bitrates for the one or more video stream layers based on the first sender participant's uplink capacity and downlink capacities of subscriber participants subscribed to the first sender participant. The bandwidth allocation module 106 can then process a second sender participant having a second lowest uplink capacity, and determine one or more video stream layers to be uploaded by the second sender participant and bitrates for the video stream layers based on the second sender participant's uplink capacity and downlink capacities of subscriber participants subscribed to the second sender participant, and so forth, until all sender participants have been processed. Once the iterative processing of all sender participants has completed, each sender participant is tasked with uploading one or more video stream layers having specified bitrates, and each subscriber participant is assigned to receive one video stream layer from each sender participant to which the subscriber participant is subscribed.

In various embodiments, the processing performed by the bandwidth allocation module 106 can be repeated periodically and/or intermittently. For example, in certain embodiments, the processing performed by the bandwidth allocation module 106 can be performed periodically at a regular time interval (e.g., every two seconds) based on updated participant information (e.g., an updated set of participants, updated uplink capacities, updated downlink capacities, updated subscription information, etc.). In certain embodiments, the processing performed by the bandwidth allocation module 106 can be repeated and/or updated based on particular events. For example, the processing performed by the bandwidth allocation module 106 can be repeated based on updated participant information each time a participant joins a group video call and/or each time a participant leaves a group video call.

For clarity of understanding, various features of the bandwidth allocation module 106 corresponding to various embodiments of the bandwidth allocation module 106 will be described in greater detail herein with reference to example sets of pseudocode 200 and 300 depicted in FIG. 2 and FIG. 3, respectively.

The video call module 108 can be configured to manage a group video call. As discussed, a group video call can have a plurality of participants, including one or more sender participants and one or more subscriber participants. The plurality of participants can be subscribed to one another in various combinations. As described above, for at least a subset of the plurality of participants (i.e., a set of sender participants), the bandwidth allocation module 106 can determine for each sender participant one or more video stream layers to be uploaded by the sender participant and a bitrate for each video stream layer. The video call module 108 can be configured to receive video stream layers uploaded by the each sender participant in a group video call. Furthermore, as described above, for at least a subset of the plurality of participants (i.e., a set of subscriber participants), the bandwidth allocation module 106 can assign each subscriber participant to receive one video stream layer from each sender participant to which the subscriber participant is subscribed. The video call module 108 can transmit appropriate video streams (i.e., video stream layers) to each subscriber participant based on video stream layer assignments as determined by the bandwidth allocation module 106.

FIG. 2 illustrates example pseudocode 200 for implementing various functions and features of the bandwidth allocation module 106, according to an embodiment of the present disclosure. It should be understood that the pseudocode 200 implements a particular embodiment, but the present disclosure is not limited to this embodiment and many variations are possible. The pseudocode 200 takes as an input a list of participants in a group video call (also referred to as "endpoints"), an uplink capacity for each participant, and a downlink capacity for each participant. The function can also receive as an input a set of "subscriptions" between the various participants.

At line 204 of the pseudocode 200, the set of participants are sorted in ascending order based on uplink capacity. In different embodiments, the bandwidth allocation module 106 can be configured to rank and/or order the set of participants based on different ordering or ranking criteria.

Lines 205-237 implement a first iterative sequence in which each participant that is identified as a sender participant is processed sequentially based on the ranked order of the participants. For example, in this example embodiment, the first iteration will process a first sender participant with a lowest uplink capacity, the second iteration will process a second sender participant with a second lowest uplink capacity, and so forth, until all sender participants have been processed. Each iteration of the first iterative sequence will be described with reference to a "sender participant" that is being processed in that iteration and one or more "subscriber participants" that are subscribed to that sender participant.

At lines 206-208, a set of subscriber participants that are subscribed to the sender participant are identified. At lines 209-210, a "reserved downlink" is determined for each subscriber participant in the set of subscriber participants. Each subscriber participant's reserved downlink is determined using a function "ComputeReservedDownlink." Determination of reserved downlinks for each subscriber participant will be described in greater detail with reference to FIG. 3. At this juncture, it is sufficient to say that a subscriber participant's reserved downlink represents a portion of the subscriber participant's available downlink capacity that is temporarily reserved for the sender participant being processed. At line 212, each subscriber participant that is subscribed to the sender participant is ranked in ascending order based on reserved downlink.

Lines 213 and 214 initialize two values "prev_layer_kbps" and "current_layer_to_upload" to be used in a second iterative sequence implemented in lines 215-231. The second iterative sequence iteratively processes each subscriber participant subscribed to the sender participant being processed in the current iteration of the first iterative sequence. In this example embodiment, each subscriber participant is processed sequentially in order from lowest reserved downlink to highest reserved downlink. The second iterative sequence will be described with reference to a "current subscriber participant" being processed in a particular iteration of the second iterative sequence, and a "current sender participant" being processed in a particular iteration of the broader, first iterative sequence. At line 216, a value "current_layer_kbps" is set equal to the lesser of the current subscriber participant's reserved downlink and the current sender participant's remaining uplink capacity. The value "current_layer_kbps" represents a size of a potential new video stream layer that may be created for and/or assigned to the current sender participant.

At lines 217-222, a determination is made as to whether or not to create a new video stream layer for the current sender participant based on a minimum difference threshold. At line 217, a determination is made as to whether a size of a potential new video stream layer (current_layer_kbps) satisfies a minimum difference threshold with respect to a previous video stream layer. In this particular embodiment, a determination is made as to whether the size of the potential new video stream layer is at least two times larger than the previous video stream layer (prev_layer_kbps). If yes, the current_layer_to_upload counter is incremented (line 218), and a new video stream layer is created for the sender participant (line 219). The new video stream layer has a bitrate equal to current_layer_kbps (line 219). At line 220, the new video stream layer's bitrate is subtracted from the current sender participant's available uplink capacity. At line 230, the current subscriber participant is mapped to the newly created video stream layer. In other words, the current subscriber participant will receive the newly created video stream layer having a bitrate equal to current_layer_kbps from the current sender participant.

However, if the potential new video stream layer (current_layer_kbps) does not satisfy the minimum difference threshold, i.e., is not at least two times larger than the previous video stream layer, then no new layer is created, and the current subscriber participant is mapped to a previous video stream layer (lines 221, 222, and 230).

As discussed, lines 215-230 of pseudocode 200 iteratively process each subscriber participant subscribed to a current sender participant. For each subscriber participant, the bitrate allocation module 106 determines a size of a potential new video stream layer that could be created (current_layer_kbps). The size of the potential new video stream layer is either equal to a current subscriber participant's reserved downlink or, if the current sender participant does not have sufficient remaining uplink to satisfy the current subscriber participant's reserved downlink, the size of the potential new video stream layer is equal to the current sender participant's remaining uplink capacity (line 216). The bitrate allocation module 106 determines whether the potential new video stream layer warrants creation of a new video stream layer to be uploaded by the sender participant, or whether the current subscriber participant should be assigned to a previously created video stream layer. This determination may be made based on a difference threshold between the size of the potential new video stream layer and a bitrate of a previously created video stream layer. In the example pseudocode 200, this difference threshold is defined such that the potential new video stream layer must be at least twice as large as a previous video stream layer (line 217). In other embodiments, different difference thresholds may be used. For example, the difference threshold may be any multiple or an absolute difference (e.g., 100 kbps greater than a previous video stream layer), or a combination thereof. In certain embodiments, multiple difference thresholds may be defined, for example, for different ranges of bitrates. If the potential new video stream layer satisfies the difference threshold, then a new video stream layer is created with a bitrate equal to the size of the potential new video stream layer (line 219), and the current subscriber participant is assigned to the new video stream layer (line 230). The current sender participant's remaining uplink capacity is also updated by subtracting the size of the new video stream layer (line 220). If the potential new video stream layer does not satisfy the difference threshold, the current subscriber participant is assigned to a previous video stream layer (i.e., a video stream layer that has already been created and assigned to the current sender participant) (lines 221, 222, and 230).

Once the second iterative sequence implemented in lines 215-231 completes processing of a set of subscriber participants subscribed to a current sender participant, the current sender participant has been assigned one or more video stream layers to be uploaded by the sender participant, with each video stream layer having a particular bitrate. For example, a sender participant may be assigned with uploading a first video stream layer having a bitrate of 100 Kbps, a second video stream layer having a bitrate of 500 Kbps, and a third video stream layer having a bitrate of 1 Mbps. Additionally, each subscriber participant in the set of subscriber participants has been assigned to a particular one of the one or more video stream layers to be uploaded by the current sender participant. A subscriber participant being assigned to a particular video stream layer indicates that the subscriber participant will receive that video stream layer having a particular bitrate from the current sender participant. For example, a first subscriber participant may be assigned to receive the 100 Kbps video stream layer, a second subscriber participant may be assigned to receive the 500 Kbps video stream layer, a third subscriber participant may be assigned to receive the 1 Mbps video stream layer, and a fourth subscriber may also be assigned to receive the 1 Mbps video stream layer. At lines 232-236, each subscriber participant's downlink capacity is updated by subtracting the bitrate of the video stream layer to which the subscriber participant has been assigned.

Each iteration of the first iterative sequence of lines 205-237 runs the second iterative sequence of lines 215-231 for a particular sender participant. It can be seen that once the second iterative sequence of lines 215-231 has been run for each sender participant, each sender participant will be assigned one or more video stream layers of varying qualities that the sender participant is responsible for uploading, and each subscriber participant will be assigned to a particular video stream layer from each sender participant to which the subscriber participant is subscribed.

Lines 223-229 implement an alternative embodiment which allows for potential further optimization of sender participant uplink capacity usage. At line 224, a determination is made as to whether a current sender participant's remaining uplink capacity is greater than or equal to a previous video stream layer's bitrate, and whether a current subscriber participant's reserved downlink is greater than or equal to twice the current sender participant's remaining uplink capacity. If both of these conditions are satisfied, the previous video stream layer's bitrate is added back into the current sender participant's remaining uplink capacity (line 225). The previous video stream layer's bitrate is modified so that the previous video stream layer's bitrate is equal to ¼ of the sender participant's remaining uplink capacity (line 226), and a new video stream layer is created having a bitrate equal to ¾ of the sender participant's remaining uplink capacity (lines 227-228). Essentially, these additional lines address a specific situation in which it may be desirable to decrease a previous video stream layer's bitrate so as to be able to accommodate a second video stream layer that is sufficiently distinct from the previous video stream layer.

FIG. 3 illustrates example pseudocode 300 for implementing various functions of the bandwidth allocation module 106, according to an embodiment of the present disclosure. In particular, the pseudocode 300 depicts one embodiment by which the bandwidth allocation module 106 can determine a reserved downlink for a subscriber participant with respect to a particular sender participant. A subscriber participant's reserved downlink can be determined based on the subscriber participant's remaining downlink capacity. As described, a subscriber participant's remaining downlink capacity is updated with each iteration of the iterative sequence implemented in lines 205-237 of pseudocode 200 of FIG. 2. In a first iteration, the subscriber participant's remaining downlink capacity is equal to their total downlink capacity. However, after the first iteration, a certain portion of the downlink capacity may be assigned to receive a video stream layer from a first sender participant, and after a second iteration, a certain portion of the downlink capacity may be assigned to receive a video stream layer from a second sender participant, and so forth, such that a particular subscriber participant's remaining downlink capacity will potentially decrease with each iteration. In various embodiments, a subscriber participant's reserved downlink can be determined based on the subscriber participant's remaining downlink capacity at the time of the determination.

A subscriber participant's reserved downlink can also be determined based on a quality level of the subscriber participant's subscription to a particular sender participant. As described, a subscriber participant's subscription to a particular sender participant can be associated with a particular quality level of a plurality of quality levels. For example, in one embodiment, there may be a low quality level, a medium quality level, and a high quality level. In one embodiment, a subscriber participant may specify which quality level they would like to receive from a particular sender participant. In another embodiment, a quality level may be inferred, for example, based on a viewing mode selected by the subscriber participant.

In the example pseudocode 300, four quality levels are defined. A quality level of 4 indicates a highest quality level, while a quality level of 1 indicates a lowest quality level. If a subscriber participant has requested a subscription having a quality level of 2 from a sender participant, the subscriber participant's reserved downlink is calculated as the subscriber participant's remaining downlink capacity divided by a number of sender participants yet to be processed for the subscriber participant (lines 305-306). For example, consider an example scenario in which the subscriber participant is subscribed to four different sender participants. Furthermore, the iterative sequence of lines 205-237 of FIG. 2 has gone through one iteration, such that one of the sender participants have been processed and the subscriber participant has been assigned to a particular video stream layer for that sender participant, but the remaining three sender participants have not yet been processed and the subscriber participant is not yet assigned to video stream layers for those sender participants. The subscriber participant's remaining downlink capacity has been updated to reflect the one video stream layer to which the subscriber participant has been subscribed, and the number of sender participants yet to be processed for the subscriber participant is equal to three. As such, in this example scenario, the subscriber participant's reserved downlink would be equal to his or her remaining downlink capacity divided by three.

If a subscriber participant has requested a level 3 or a level 4 subscription from a sender participant (i.e., a high quality subscription), the subscriber participant's reserved downlink is calculated as the subscriber participant's remaining downlink capacity multiplied by a high definition ratio (HD_RATIO). In the example pseudocode 300, the high definition ratio is set to 0.5 (line 304), such that the reserved downlink is calculated as half of the subscriber participant's remaining downlink capacity. In various embodiments, the HD_RATIO may be a different value, and, as shown in the comment to line 304, can vary based on, for example, the subscriber participant's remaining subscriptions left to be processed.

If a subscriber participant has requested a level 1 subscription from a sender participant, the subscriber participant's reserved downlink may depend on the subscriber participant's remaining subscriptions. In the example pseudocode 300, if the subscriber participant has a pending, unprocessed higher definition layer subscription (e.g., level 3 or level 4), the reserved downlink is calculated as the subscriber participant's remaining downlink capacity multiplied by one minus the HD_RATIO, and the product is divided by the subscriber participant's remaining subscriptions minus one (lines 311-312). In essence, this calculation reserves a portion of the subscriber participant's remaining downlink capacity for the pending higher definition layer subscription by calculating the product of the remaining downlink capacity and one minus the HD_RATIO, and then divides the left over downlink capacity by the number of pending subscriptions minus one. However, if the subscriber participant does not have a pending, unprocessed high definition layer subscription, the reserved downlink is calculated in the same way as the level 2/medium definition subscription (lines 313-315).

Additional clarity and explanation will now be provided with reference to an example scenario.

Figure 4A:
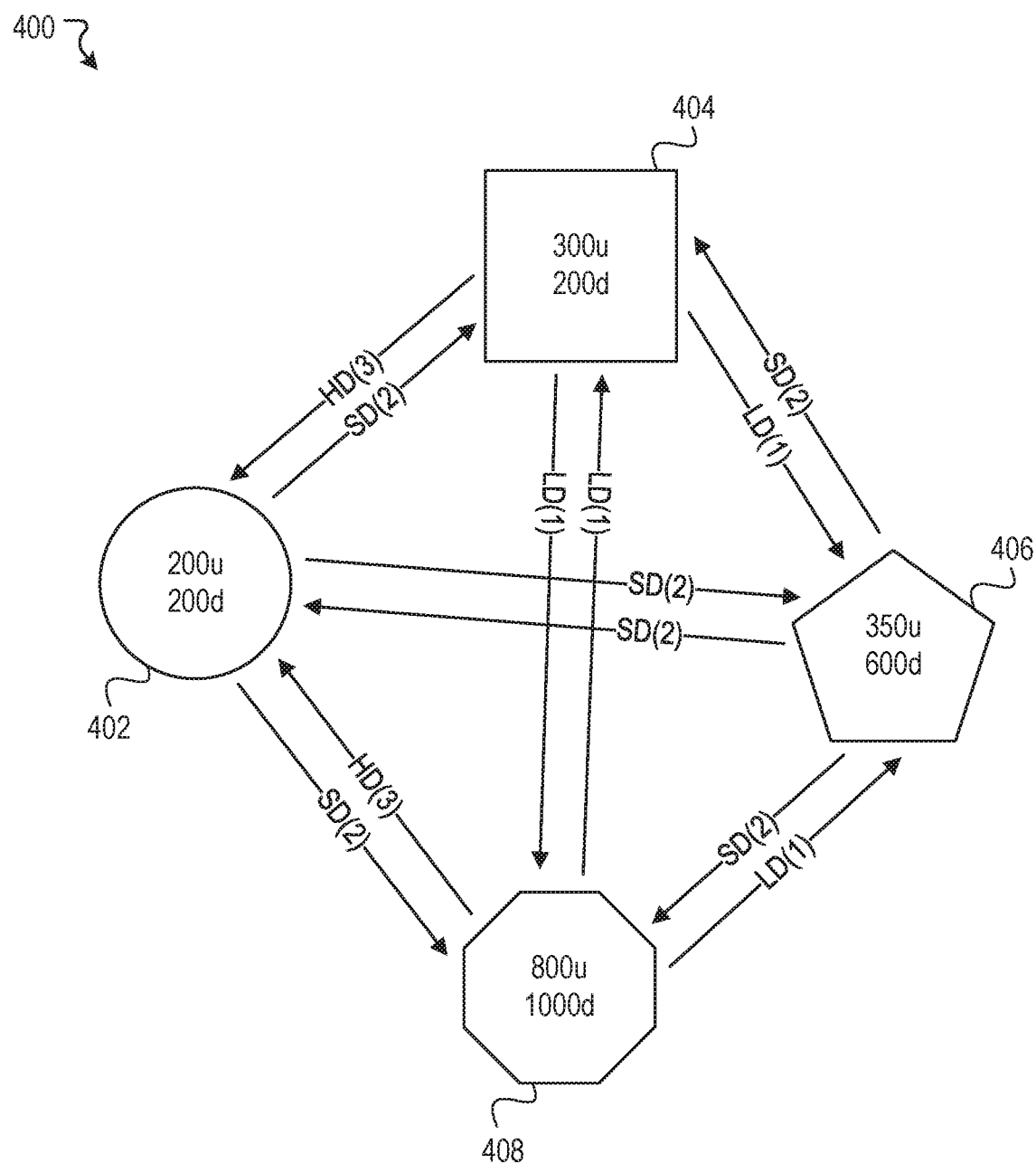
FIGS. 4A-4Q illustrate an example scenario associated with group video call simulcast optimization, according to an embodiment of the present disclosure.
Figure 4B:
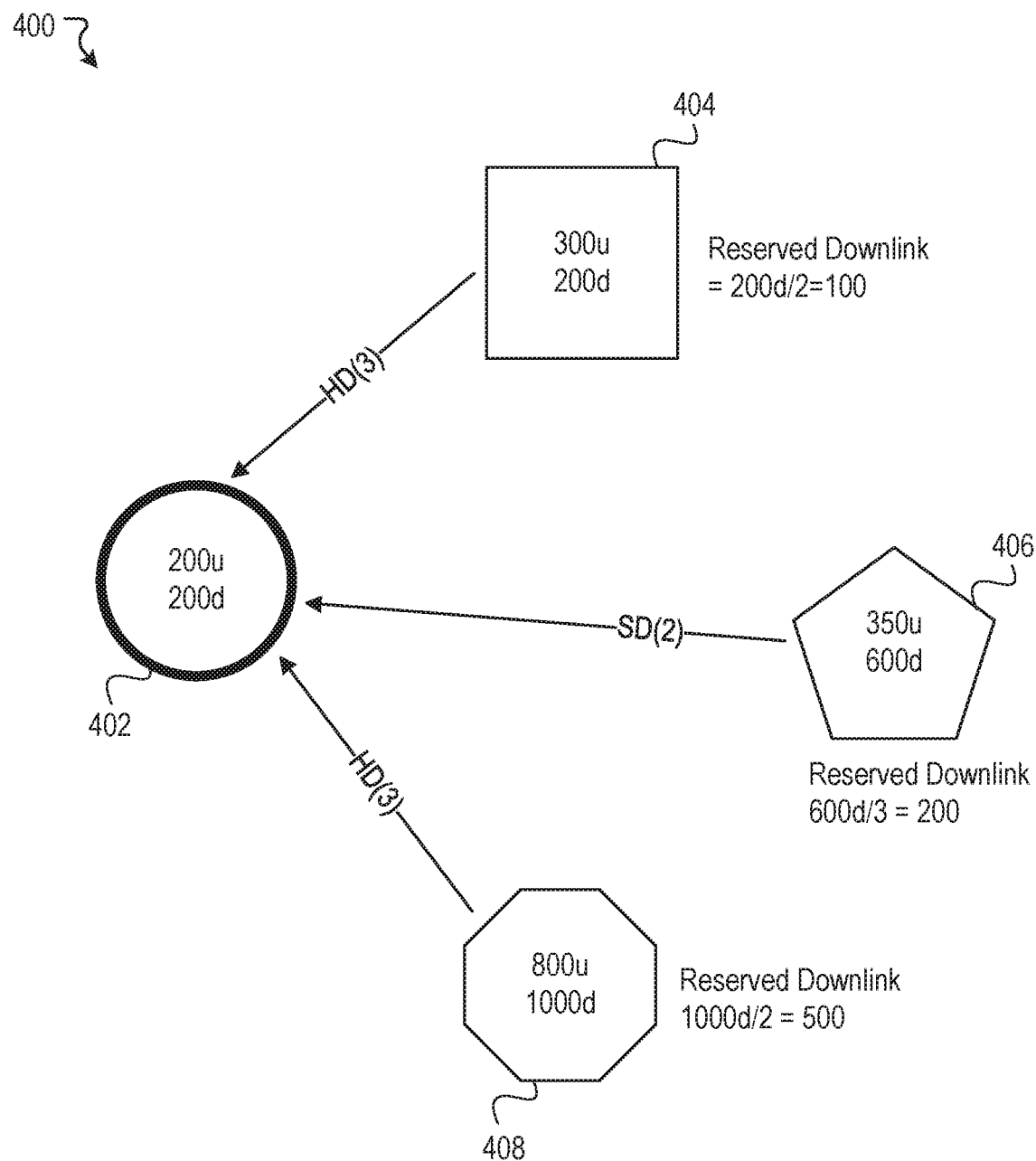
Figure 4C:
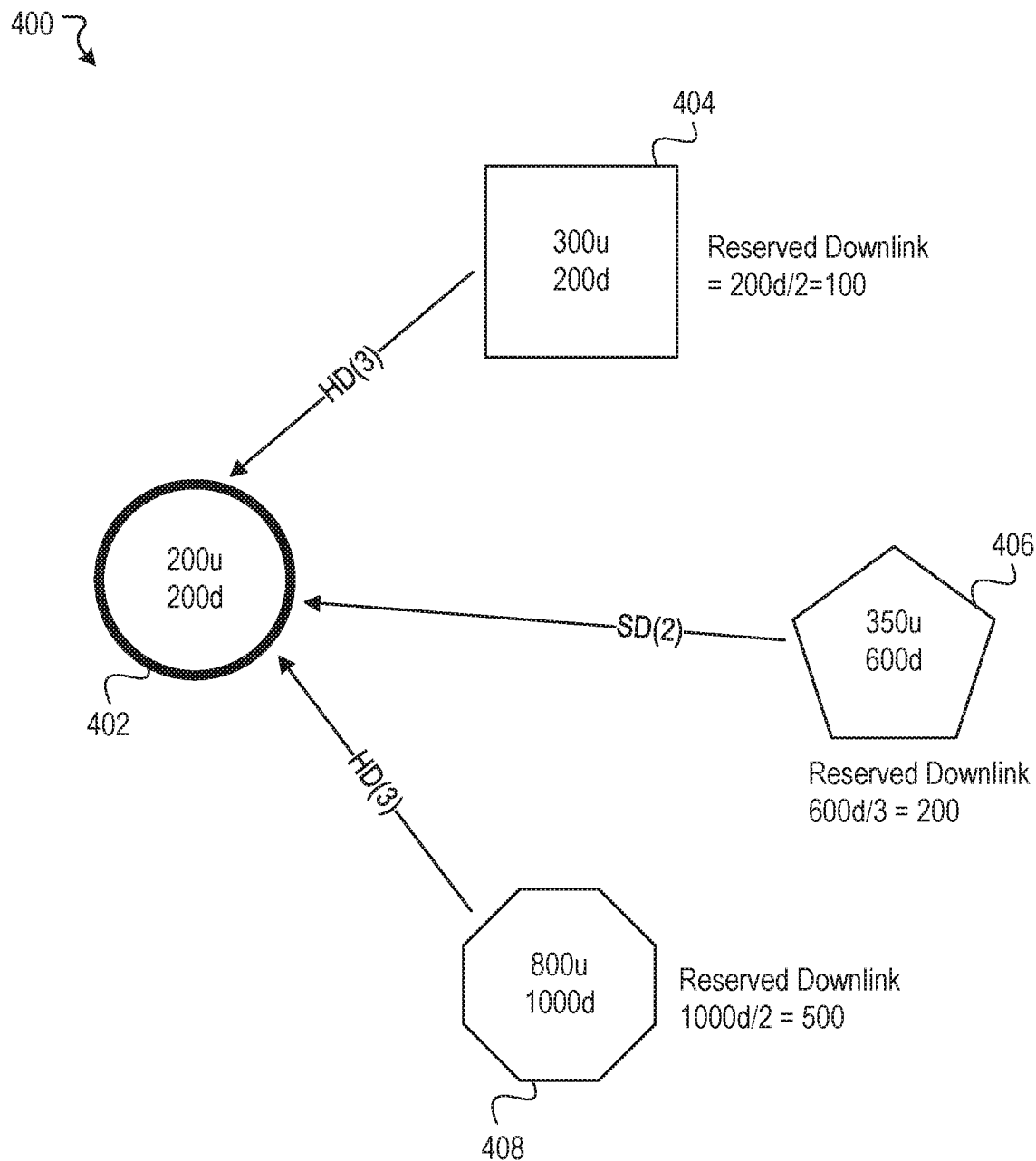
Figure 4D:
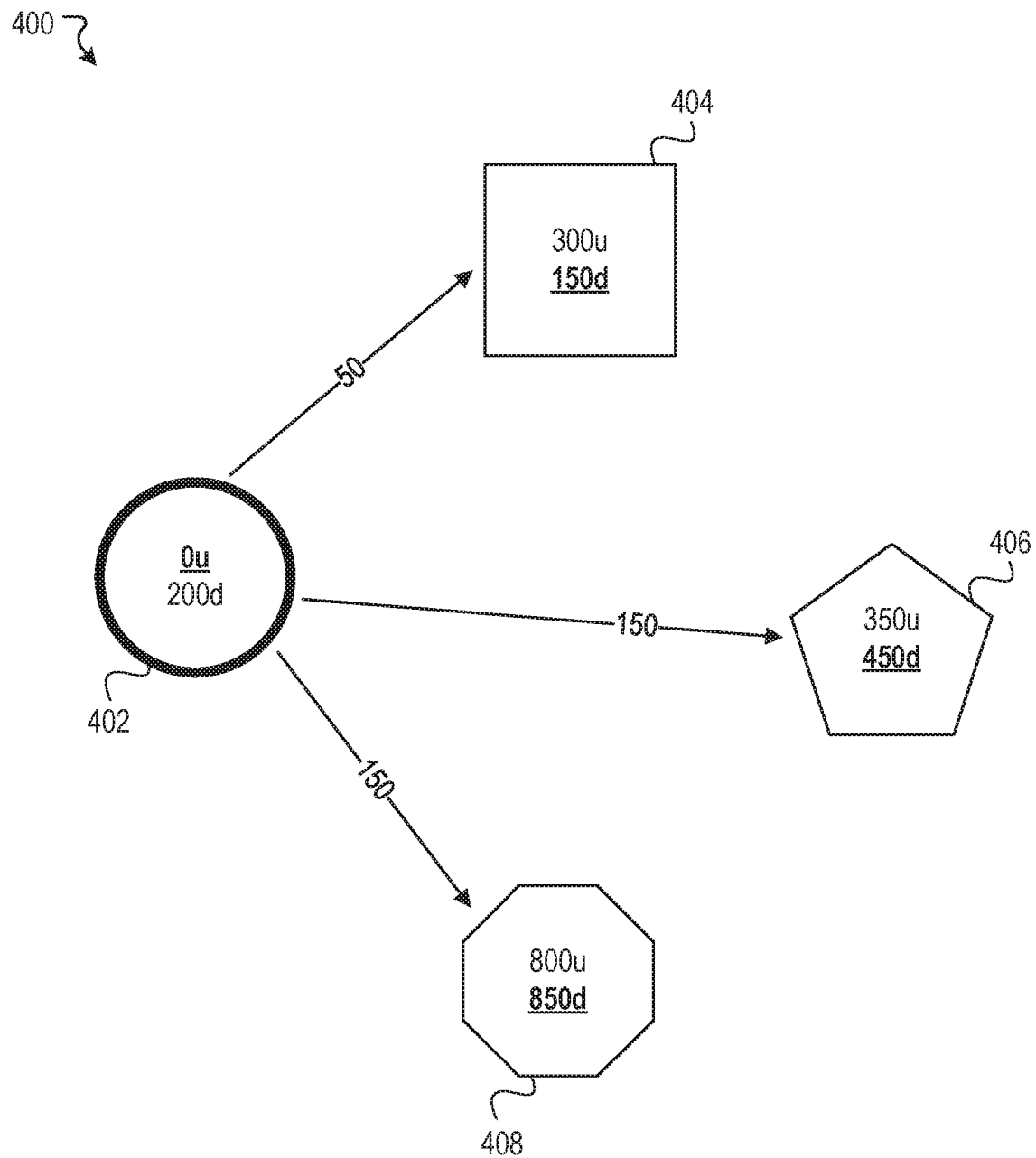
Figure 4E:
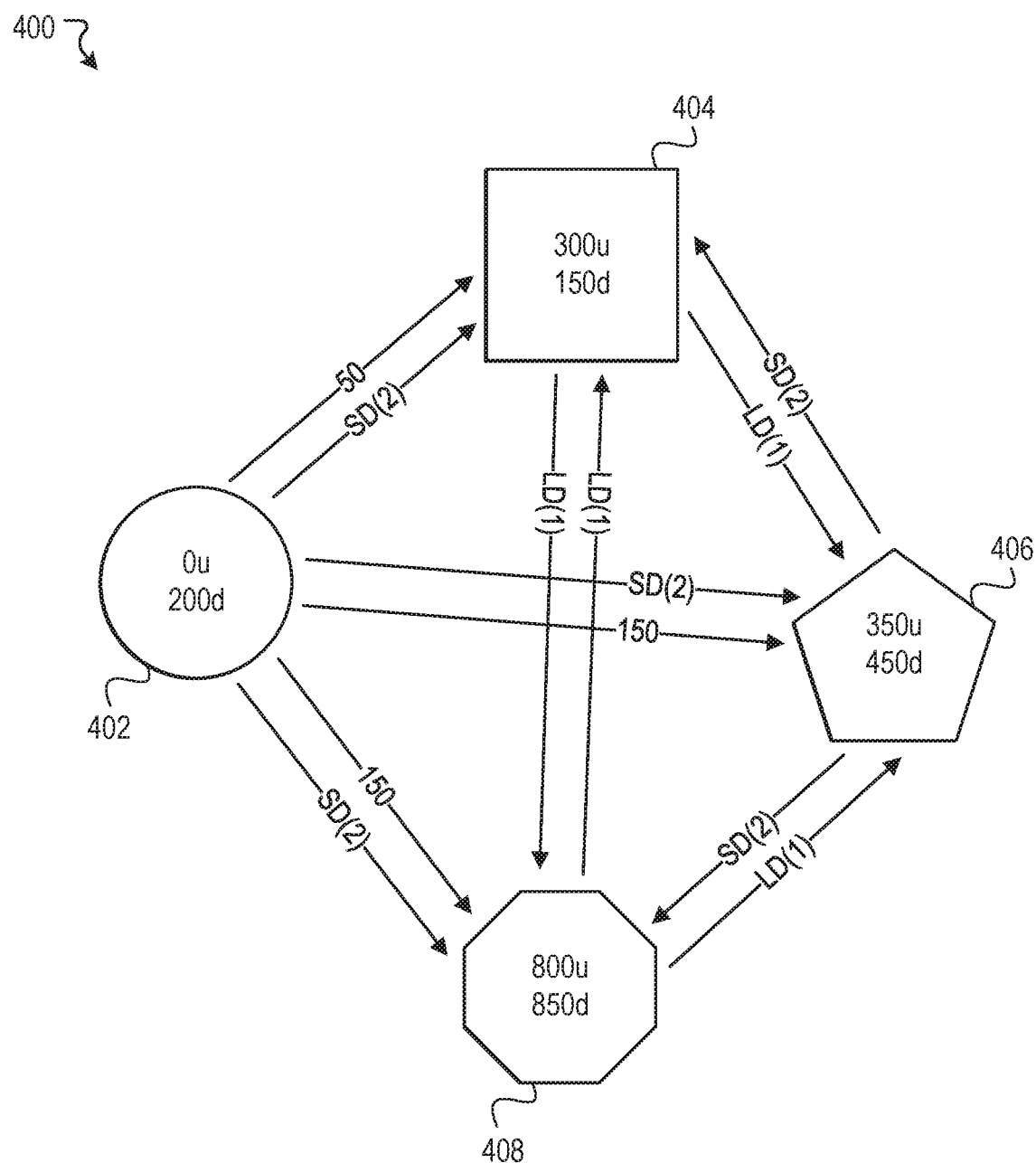
Figure 4F:
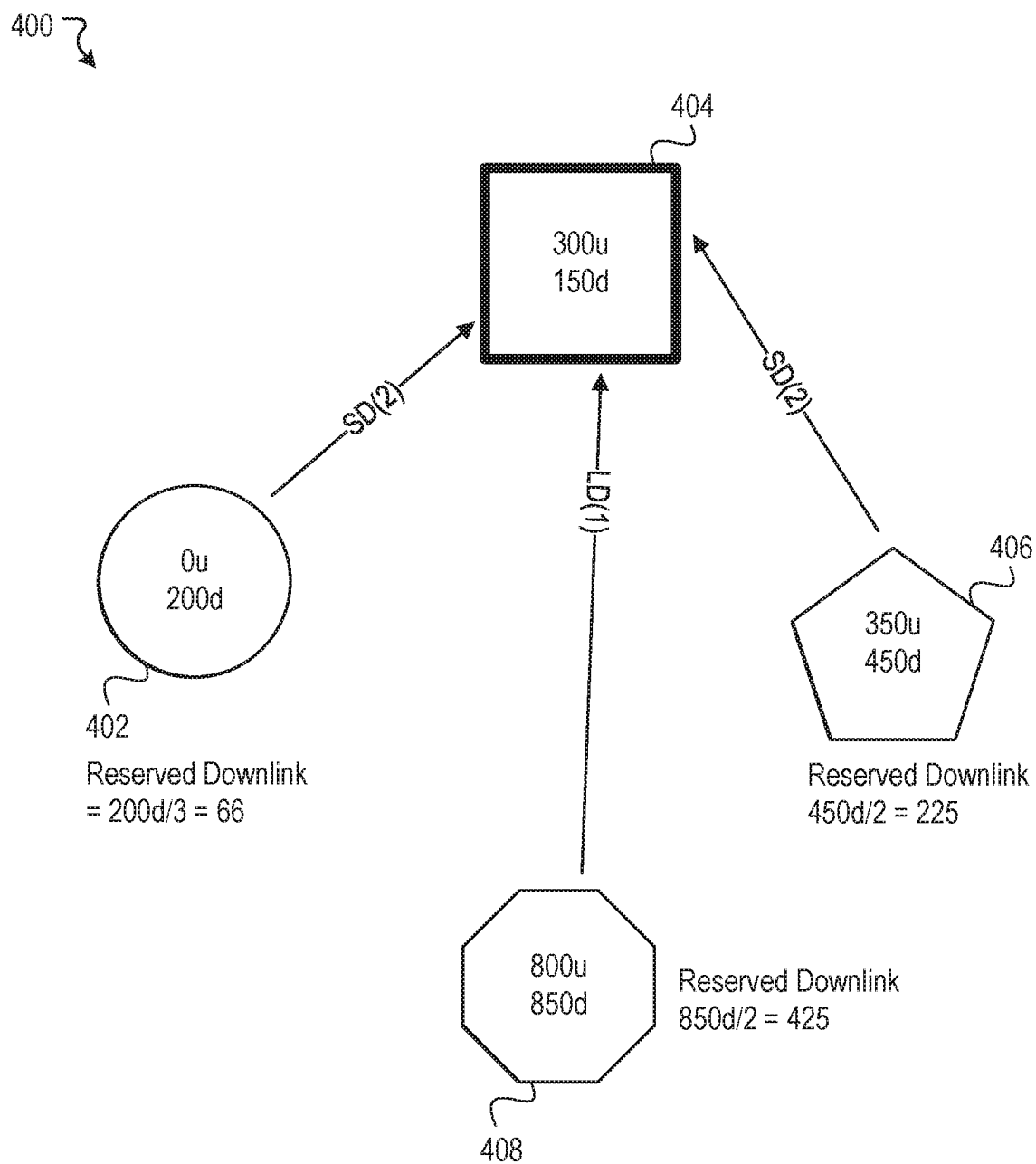
Figure 4G:
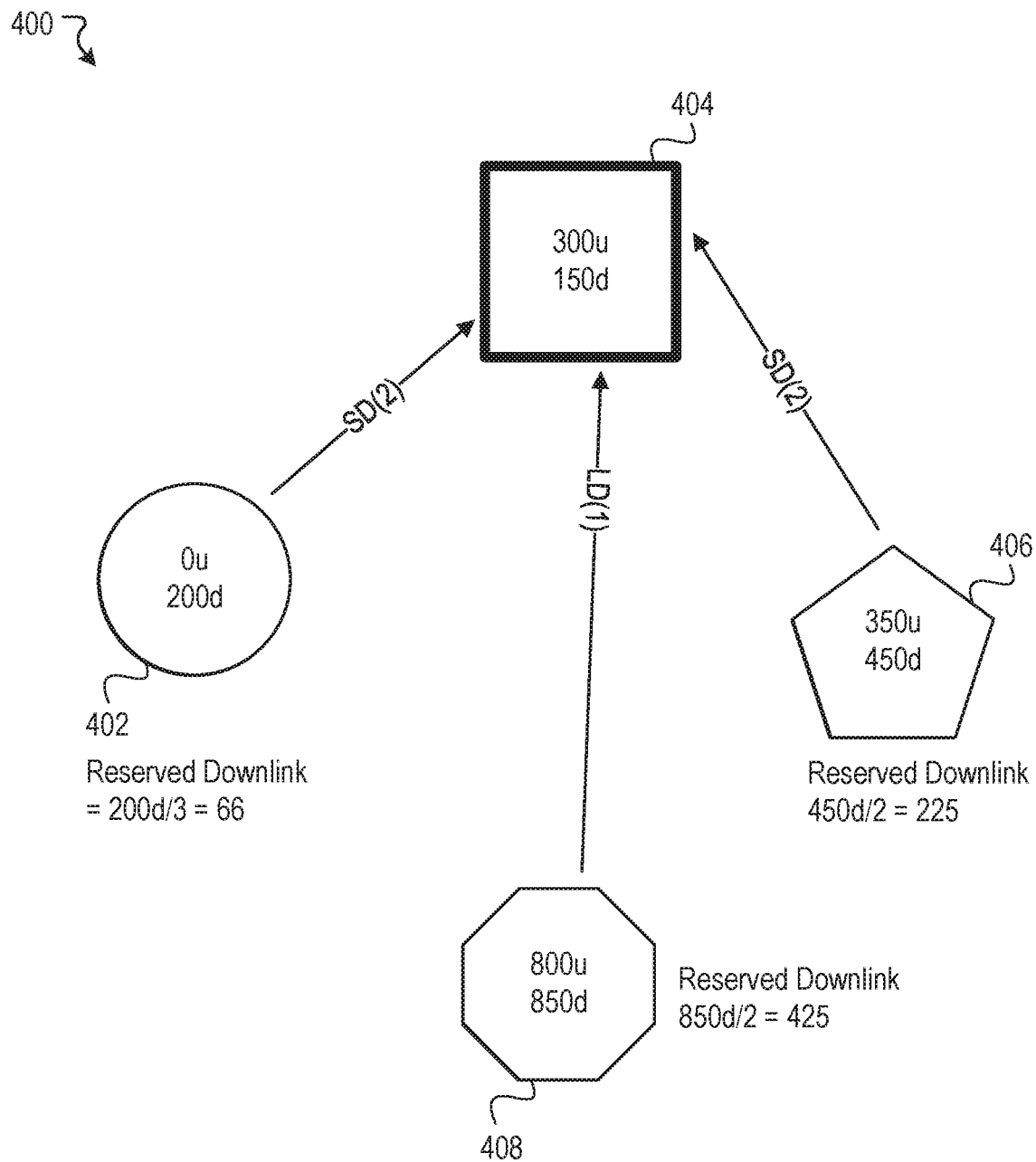
Figure 4H:
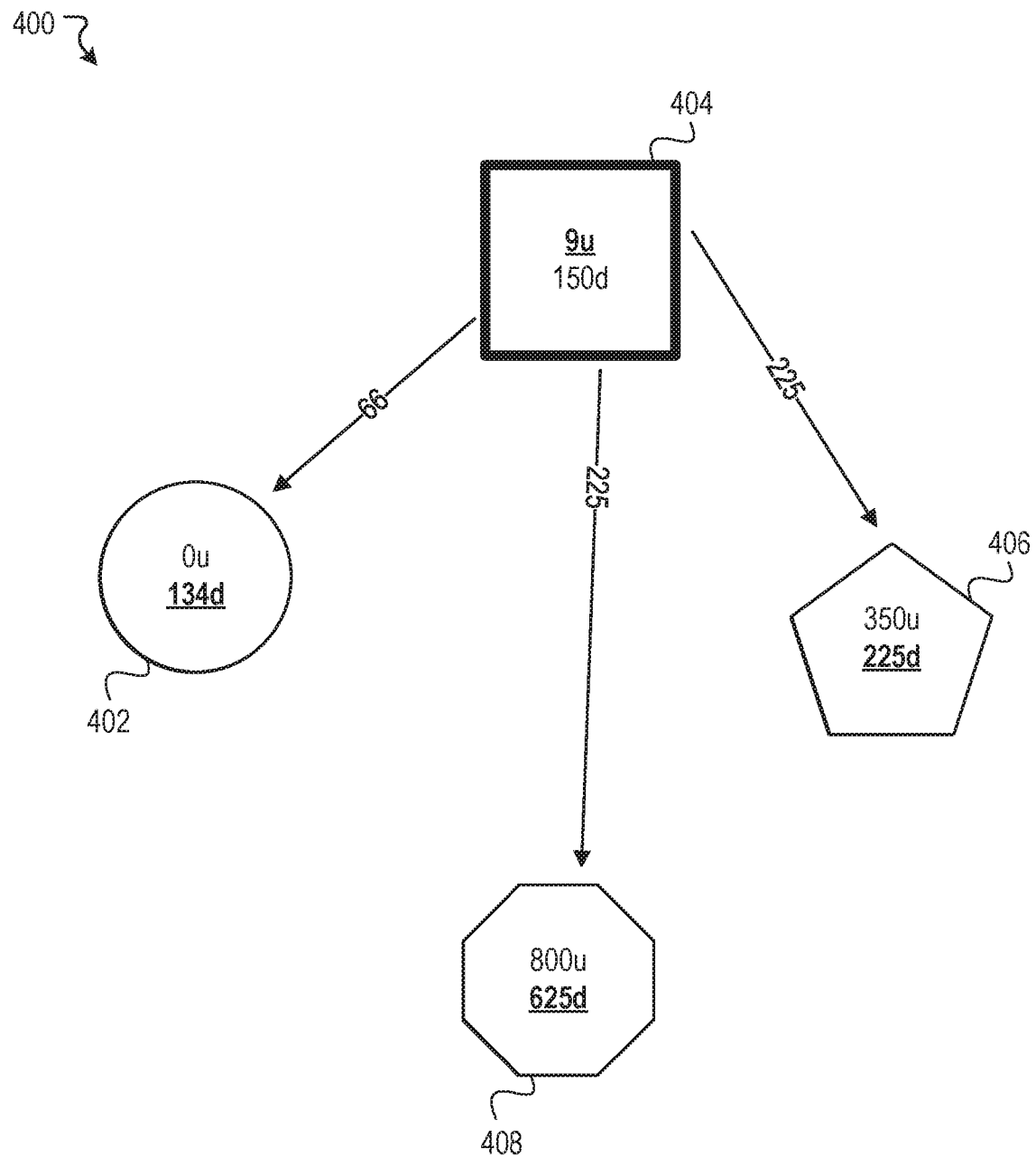
Figure 4I:
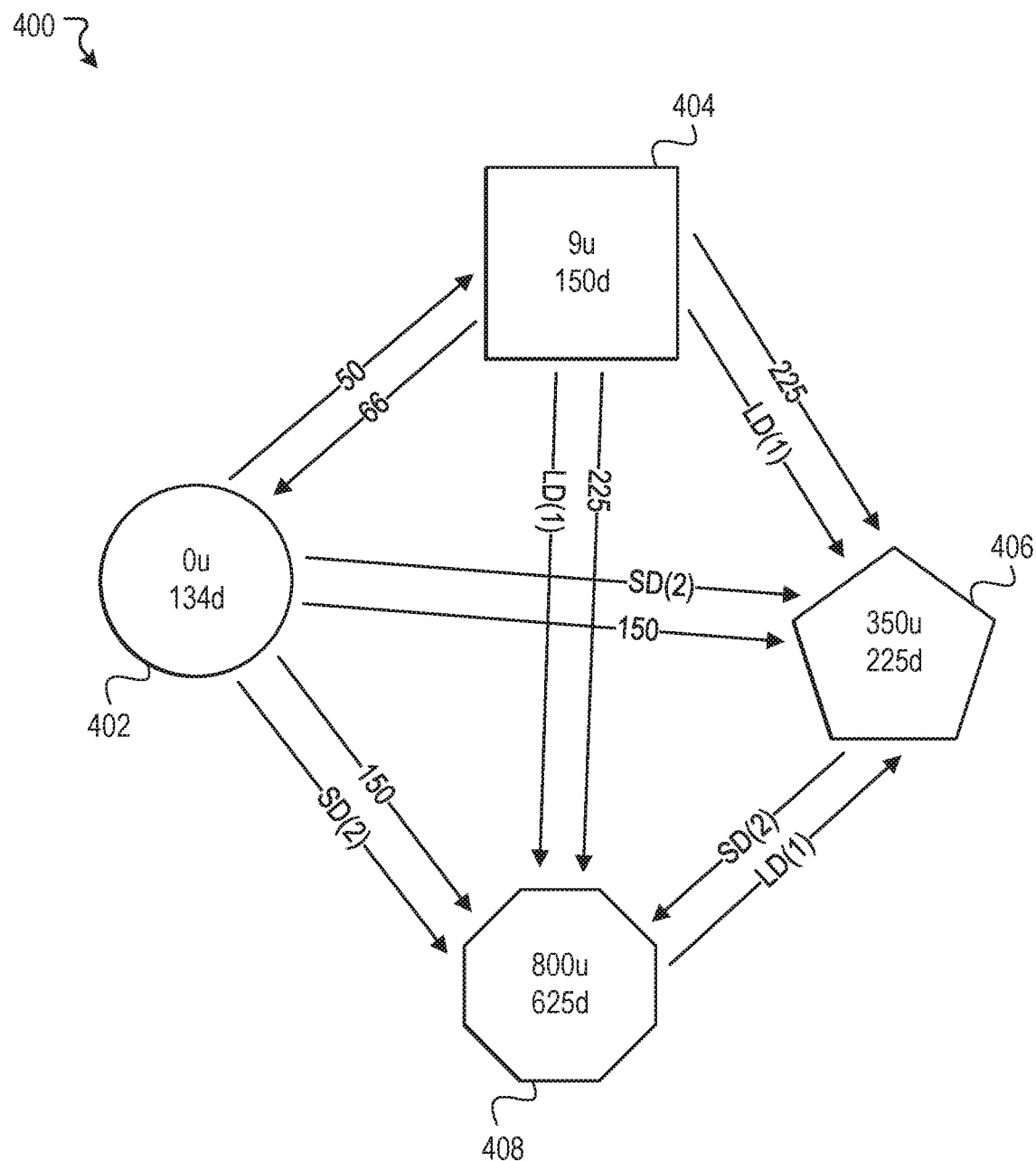
Figure 4J:
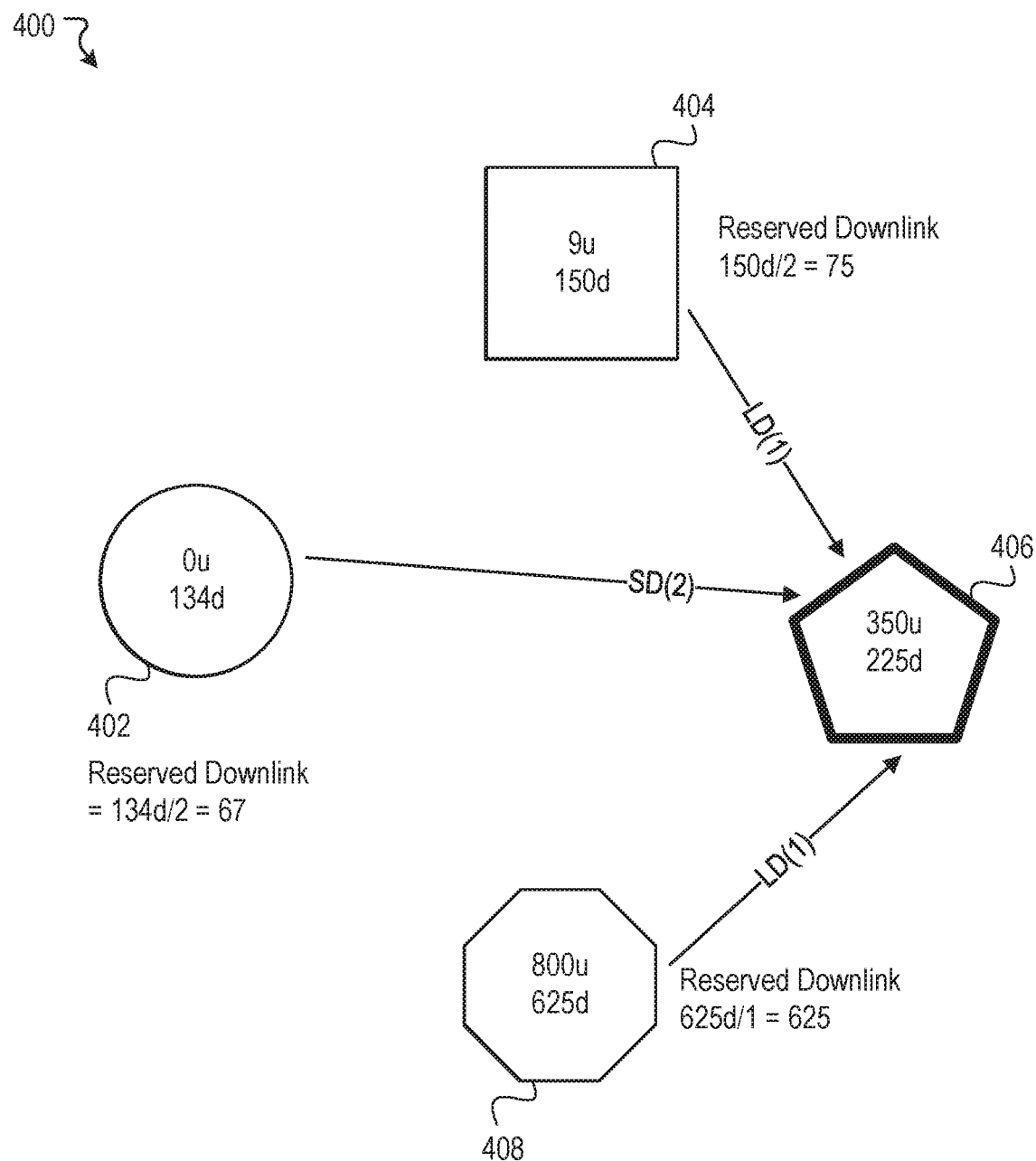
Figure 4K:
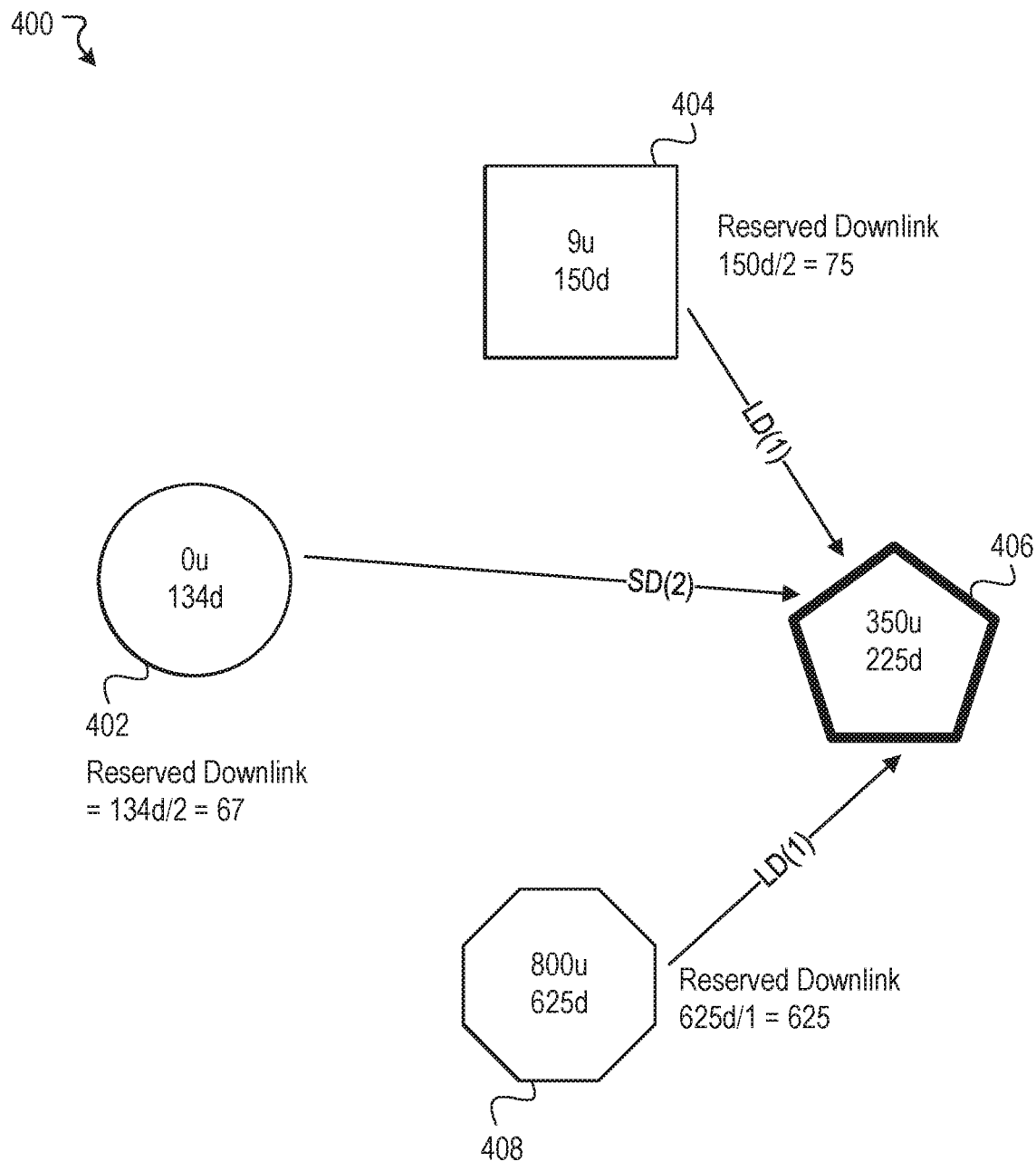
Figure 4L:
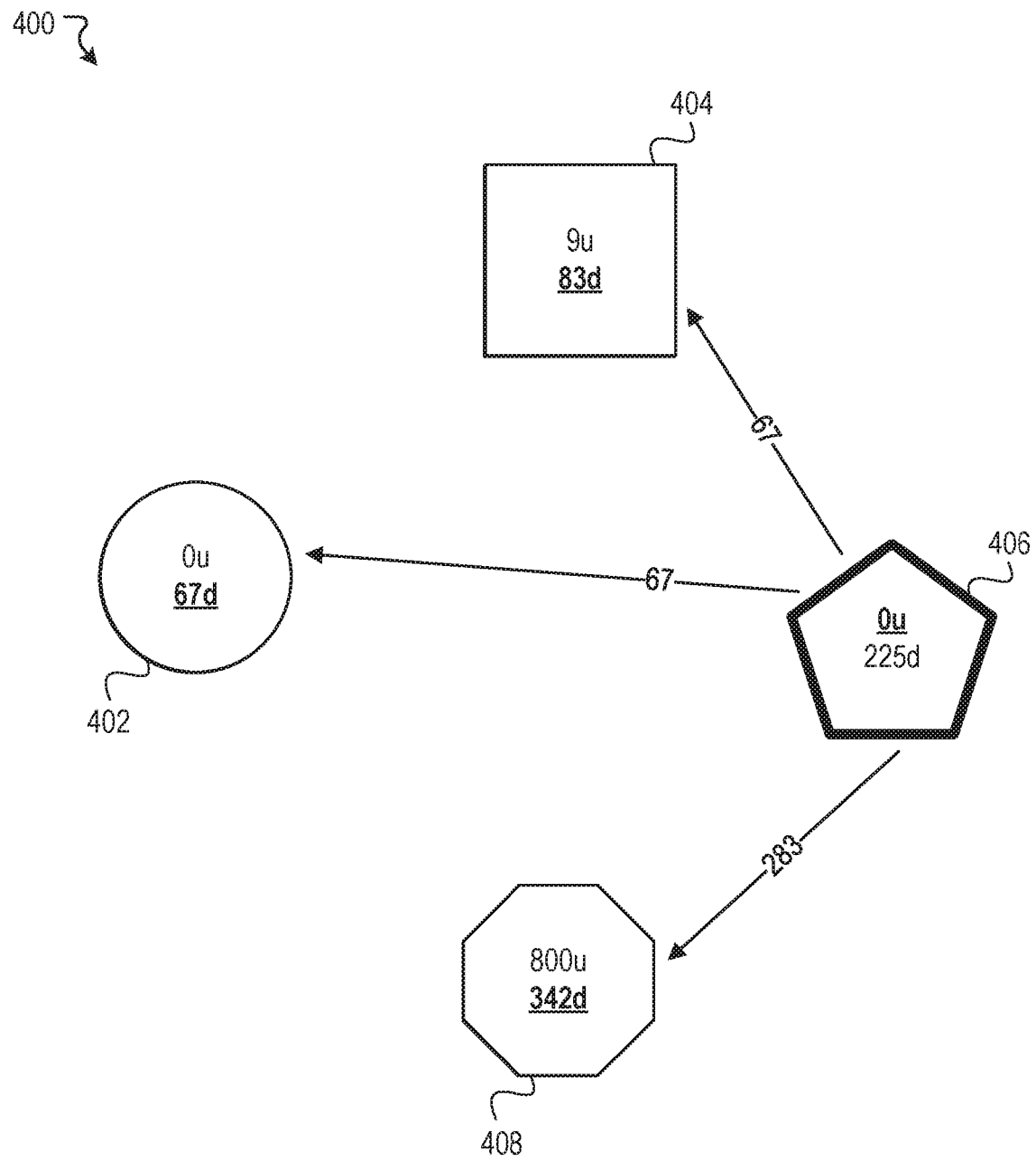
Figure 4M:
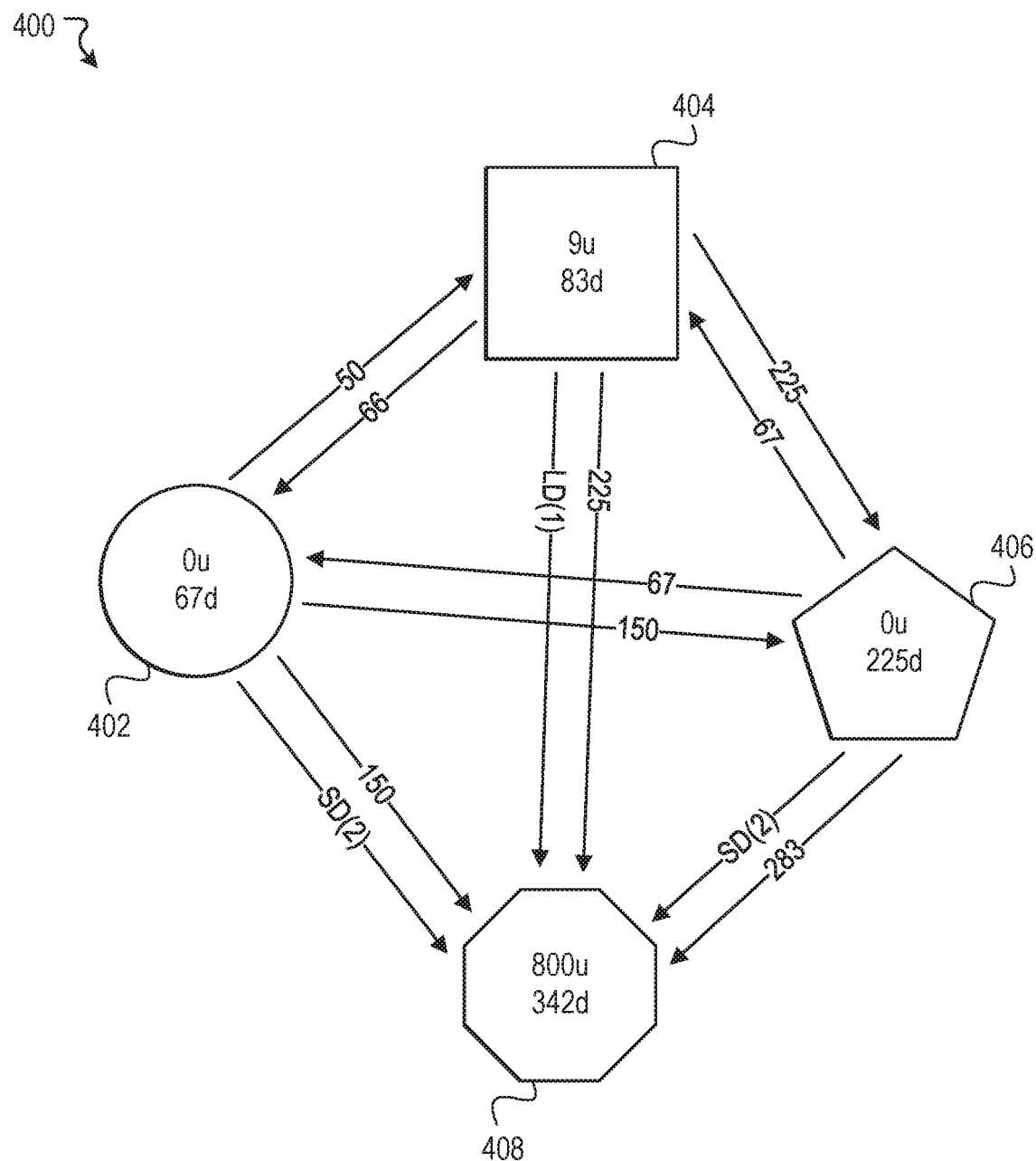
Figure 4N:
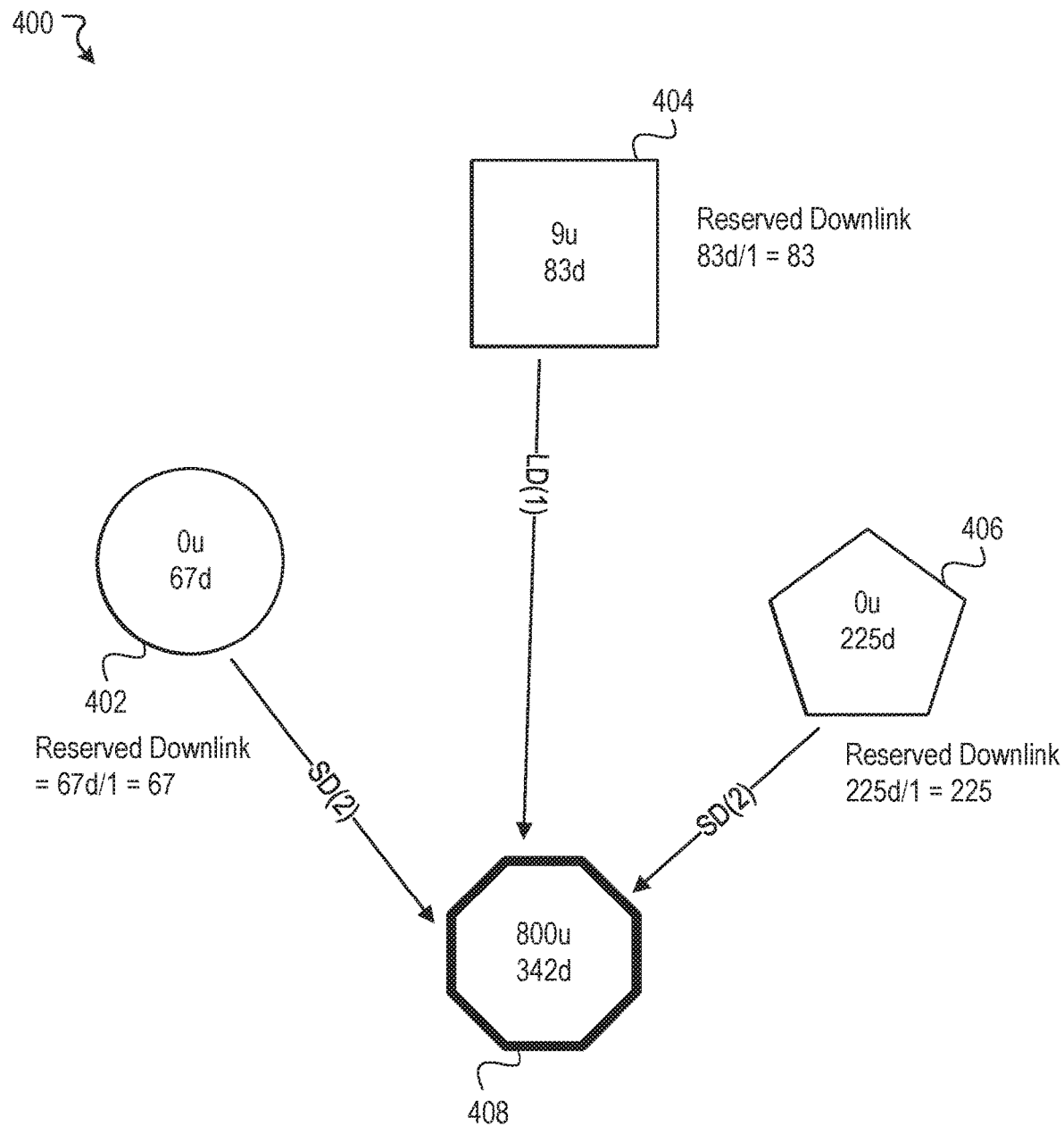
Figure 4O:
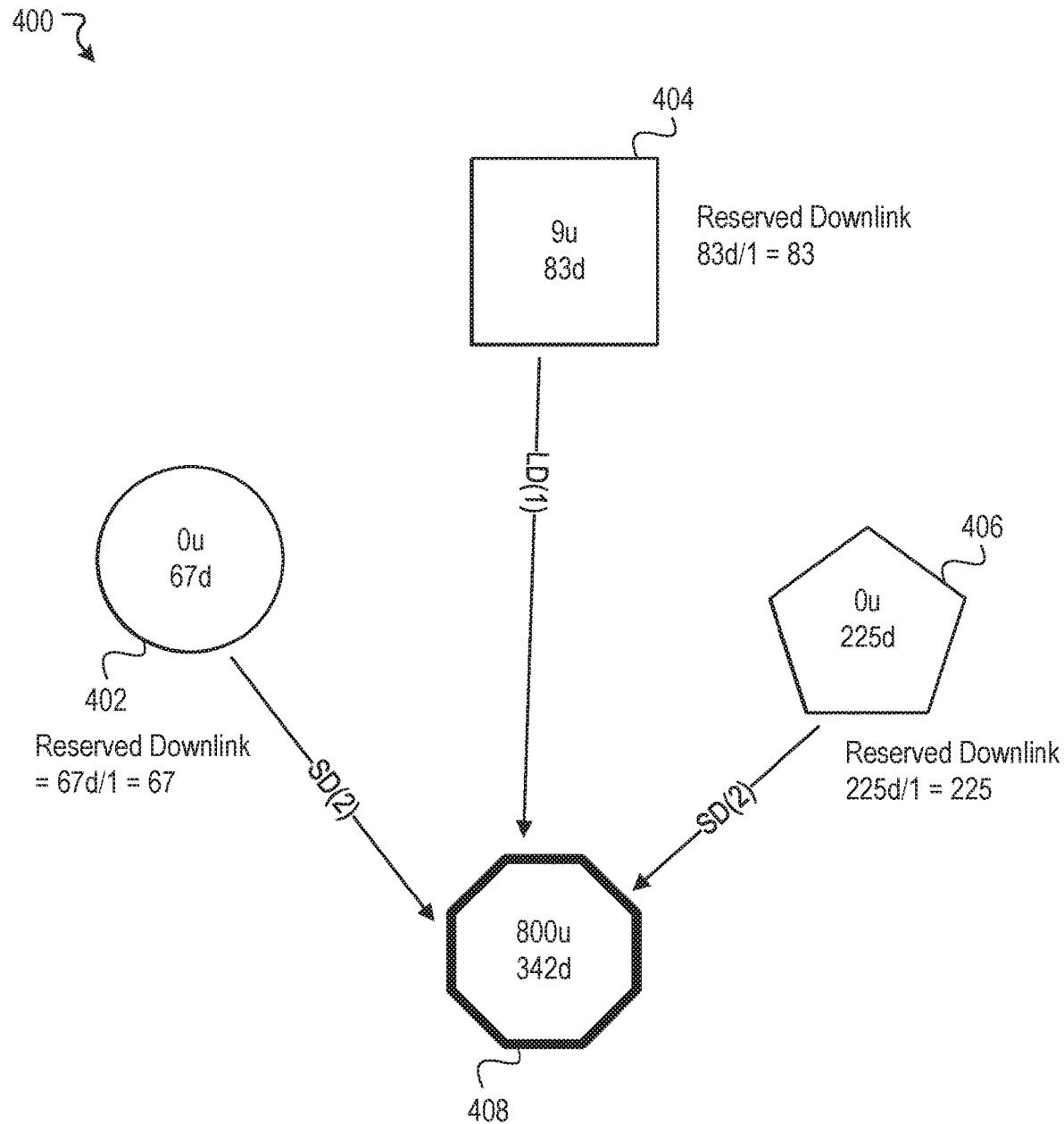
Figure 4P:
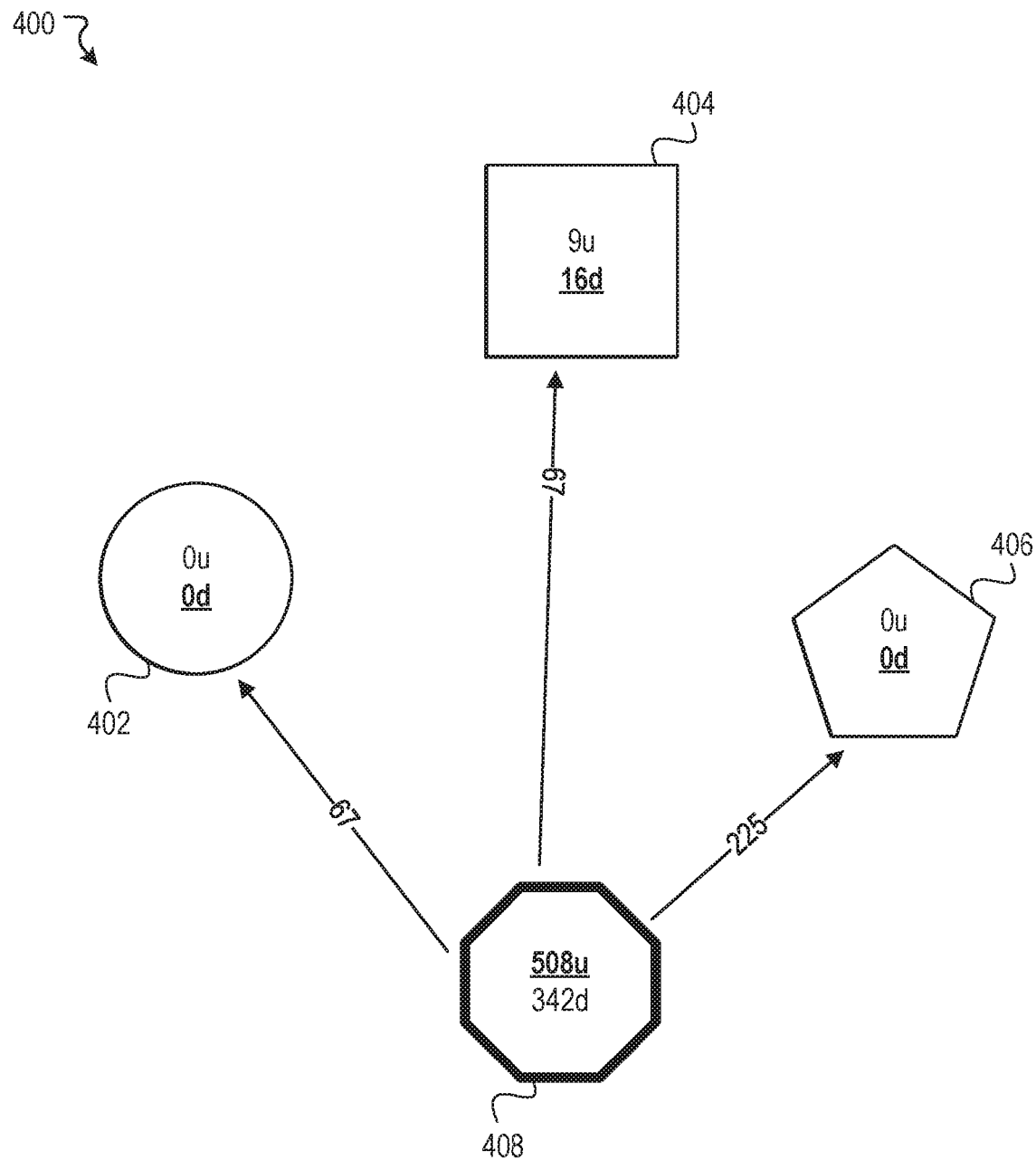
Figure 4Q:
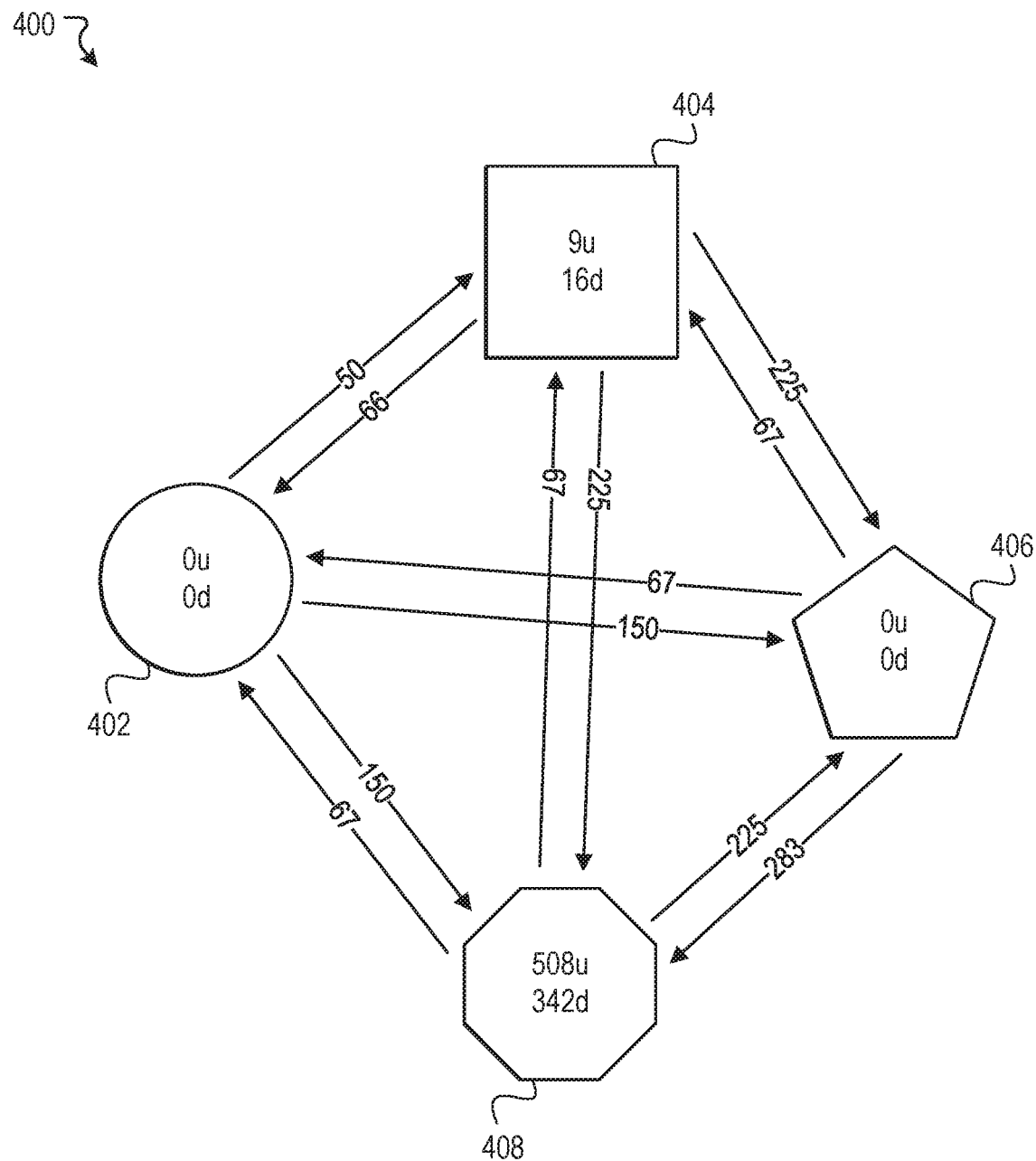

FIG. 4A-4Q illustrate an example scenario 400 associated with group video call simulcast optimization, according to an embodiment of the present disclosure. The example scenario 400 demonstrates various functions of the group video call module 102, according to various embodiments. As can be seen in FIG. 4A, the example scenario 400 includes four users 402, 404, 406, and 408 that are participating in a group video call. Each user is subscribed to every other user. Furthermore, the example scenario 400 includes three subscription quality levels, level 1 or "low definition" (LD), level 2 or "standard definition" (SD), and level 3 or "high definition" (HD).

User 402 has an uplink capacity of 200 kbps and a downlink capacity of 200 kbps. User 402 has requested a standard definition video stream from every other user. This may be an instance, for example, in which the user 402 has selected a "grid view" of the group video call such that the other participants are all displayed in individual windows of substantially equal size.

User 404 has an uplink capacity of 300 kbps and a downlink capacity of 200 kbps. User 404 has requested a low definition video stream from users 406 and 408, and a high definition video stream from user 402. This may be an instance, for example, in which the user 404 has the user 402 on a full-screen view, and has users 406 and 408 displayed in thumbnail views.

User 406 has an uplink capacity of 350 kbps and a downlink capacity of 600 kbps. Like user 402, user 406 has requested standard definition video streams from every other user.

User 408 has an uplink capacity of 800 kbps and a downlink capacity of 1000 kbps. Similar to user 404, user 408 has requested a low definition video stream from users 404 and 406, and a high definition video stream from user 402.

As discussed above, in one embodiment, the set of users 402, 404, 406, 408 can be ranked in ascending order based on uplink capacity, and then iteratively processed in sequence based on the ranking. In the example scenario 400, the group video call is processed according to the embodiment implemented in pseudocode 200 of FIG. 2, with lines 223-229 of pseudocode 200 being included.

In FIG. 4B, a first iteration of the iterative sequence implemented in lines 205-237 of FIG. 2 processes user 402, who has the lowest uplink capacity. In this first iteration, user 402 is the sender participant, and users 404, 406, and 408 are each subscriber participants that are subscribed to user 402. In the example scenario 400, reserved downlinks are determined for each subscriber participant with respect to the sender participant according to the embodiment implemented in pseudocode 300 of FIG. 3. As described, each subscriber participant's reserved downlink is determined based on the subscriber participant's remaining downlink capacity and a quality level associated with the subscriber participant's subscription to the sender participant. User 404 has requested a high definition video stream from the sender participant, i.e., user 402. As such, user 404's reserved downlink is calculated as user 404's remaining downlink capacity (200 kbps) divided by 2 (as specified in the HD_RATIO in line 304 of pseudocode 300). Therefore, user 404's reserved downlink is 100 Kbps. User 406 has requested a standard definition video stream from user 402. As such, user 406's reserved downlink is calculated as user 406's remaining downlink capacity (600 kbps) divided by the number of user 406's subscriptions remaining to be processed. In this first iteration, none of the sender participants have been processed, meaning user 406 still has three subscriptions remaining to be processed. As such, user 406's reserved downlink is 600 kbps/3=200 kbps. User 408 has requested a high definition video stream from user 402. As such, user 408's reserved downlink is calculated as user 408's remaining downlink capacity (1000 kbps) divided by 2, which is 500 Kbps.

FIG. 4C illustrates further processing of the subscriber participants. Per line 212 of FIG. 2, each subscriber participant is ranked in ascending order based on reserved downlink. Per the second iterative sequence implemented in lines 215-236 of FIG. 2, each subscriber participant is processed sequentially based on the ranking. A first iteration of the second iterative sequence processes user 404, who has the lowest reserved downlink. A first video stream layer having a size equal to user 404's reserved downlink (100 Kbps) is created, and user 404 is assigned to the first video stream layer. Creation of the first video stream layer having a bitrate of 100 Kbps indicates that the sender participant, user 402, will upload a first video stream layer having a bitrate of 100 Kbps. As such, user 402 has 100 Kbps of his or her uplink capacity dedicated to the first video stream layer, and 100 Kbps of uplink capacity remaining. Assignment of the subscriber participant, user 404, to this first video stream layer indicates that user 404 will receive a 100 Kbps video stream layer from user 402. As described previously, while the present disclosure may state that a subscriber participant receives a video stream layer "from" a sender participant, it should be understood that, in various embodiments, this receipt is not a direct transmission of a video stream layer from one participant to another. Rather, in various embodiments, a subscriber participant receives a video stream layer "from" a sender participant by virtue of the sender participant uploading the video stream layer to a central server, and the central server transmitting the video stream layer to the subscriber participant based on the subscriber participant being assigned to receive that video stream layer.

A second iteration of the second iterative sequence processes user 406, who has the second lowest reserved downlink. Based on line 217 of FIG. 2, a determination is made that there is insufficient remaining uplink capacity to create a new layer, since user 402's remaining uplink capacity (100 Kbps) is not two times greater than the previously created video stream layer (100 Kbps). However, based on line 224 of FIG. 2, a determination is made that user 402's remaining uplink capacity is greater than or equal to the previously created video stream layer, and user 406's reserved downlink is greater than or equal to twice user 402's remaining uplink. In such a scenario, based on lines 224-229 of FIG. 2, the previous video stream layer's bitrate is added back into user 402's remaining uplink capacity (line 225), the previous video stream layer is redefined to have a bitrate equal to ¼ of the remaining uplink capacity (line 226), and a new video stream layer is created with a bitrate equal to ¾ of the remaining uplink capacity (line 228). As such, the first video stream layer is redefined to have a bitrate of 50 kbps rather than 100 Kbps, and a new, second video stream layer is created having a bitrate of 150 kbps. User 404 remains assigned to the first video stream layer, which is now a 50 kbps video stream, and user 406 is assigned to the newly created second video stream layer, which is a 150 kbps video stream. User 402 is now assigned to upload a 50 kbps video stream layer and a 150 kbps video stream layer, which completely utilizes user 402's uplink capacity.

A third iteration of the second iterative sequence processes user 408, who has the third lowest reserved downlink. There is insufficient uplink capacity remaining for user 402 to create a new video stream layer. As such, user 408 is assigned to the previous video stream layer, i.e., the 150 kbps video stream layer.

FIG. 4D summarizes the results of the first iteration of the iterative sequence of lines 205-237 of FIG. 2. User 402 has been assigned to upload two video stream layers, a first video stream layer having a bitrate of 50 kbps and a second video stream layer having a bitrate of 150 kbps. User 402's uplink capacity is updated by subtracting the bitrates of the two video stream layers that user 402 will upload, resulting in a remaining uplink capacity of 0 kbps.

User 404 is assigned to receive the first video stream layer from user 402, and users 406 and 408 are both assigned to receive the second video stream layer from user 402. User 404's downlink capacity is updated by subtracting 50 kbps, user 406's downlink capacity is updated by subtracting 150 kbps, and user 408's downlink capacity is updated by subtracting 150 kbps. FIG. 4E presents the status of the participants after the first iteration of the iterative sequence of lines 205-237 of FIG. 2.

FIG. 4F illustrates the start of a second iteration of the iterative sequence of lines 205-237 of FIG. 2. In this second iteration, user 404 is selected as the sender participant being processed, as user 404 has the second lowest uplink capacity of the four users, and users 402, 406, and 408 are each subscriber participants that are subscribed to user 404. Once again, reserved downlinks are determined for each subscriber participant with respect to the sender participant, according to the embodiment implemented in pseudocode 300 of FIG. 3. User 402 has requested a standard definition video stream from the sender participant, i.e., user 404. As such, user 402's reserved downlink is calculated as user 402's remaining downlink capacity (200 kbps) divided by the number of user 402's subscriptions remaining to be processed. User 402 still has three subscriptions remaining to be processed (users 404, 406, and 408), so user 402's reserved downlink is 200 kbps/3=66 kbps. User 406 has also requested a standard definition video stream from user 404. As such, user 406's reserved downlink is calculated as user 406's remaining downlink capacity (450 kbps) divided by the number of user 406's subscriptions remaining to be processed. One of user 406's subscriptions has already been processed (user 402), so user 406 has only two subscriptions remaining to be processed (users 404 and 408). As such, user 406's reserved downlink is 450 kbps/2=225 kbps. User 408 has requested a low definition video stream from user 402 (as addressed by lines 309-315 of FIG. 3). User 408 does not have a high definition subscription remaining to be processed. Therefore, user 408's reserved downlink is equal to user 408's remaining downlink capacity divided by the number of user 408's subscriptions remaining to be processed. User 408 has two subscriptions remaining to be processed (users 404 and 406). Therefore, user 408's reserved downlink is 850 kbps/2=425 kbps.

FIG. 4G illustrates further processing of the subscriber participants. Per line 212 of FIG. 2, each subscriber participant is ranked in ascending order based on reserved downlink. Per the second iterative sequence implemented in lines 215-236 of FIG. 2, each subscriber participant is processed sequentially based on the ranking. A first iteration of the second iterative sequence processes user 402, who has the lowest reserved downlink. A first video stream layer having a size equal to user 402's reserved downlink (66 kbps) is created, and user 402 is assigned to the first video stream layer. Creation of the first video stream layer having a bitrate of 66 kbps indicates that the sender participant, user 404, will upload a first video stream layer having a bitrate of 66 kbps. As such, user 404 has 66 kbps of his or her uplink capacity dedicated to the first video stream layer, and 234 kbps of uplink capacity remaining.

A second iteration of the second iterative sequence processes user 406, who has the second lowest reserved downlink. A determination is made that user 406's reserved downlink (which is less than user 404's remaining uplink capacity) is at least twice the previously created video stream layer. As such, a new second video stream layer having a size equal to user 406's reserved downlink (225 kbps) is created. User 404 is now tasked with uploading two video streams, a first that is 66 kbps and a second that is 225 kbps, which means that user 404 has 9 kbps of uplink capacity remaining. User 406 is assigned to the second video stream layer.

A third iteration of the second iterative sequence processes user 408, who has the third lowest reserved downlink. There is insufficient uplink capacity remaining for user 404 to create a new video stream layer. As such, user 408 is assigned to the previous video stream layer, i.e., the 225 kbps video stream layer.

FIG. 4H summarizes the results of the second iteration of the iterative sequence of lines 205-237 of FIG. 2. User 404 has been assigned to upload two video stream layers, a first video stream layer having a bitrate of 66 kbps and a second video stream layer having a bitrate of 225 kbps. User 404's uplink capacity is updated by subtracting the bitrates of the two video stream layers that user 404 will upload, resulting in a remaining uplink capacity of 9 kbps. User 402 is assigned to receive the first video stream layer from user 404, and users 406 and 408 are both assigned to receive the second video stream layer from user 404. User 402's downlink capacity is updated by subtracting 66 kbps, user 406's downlink capacity is updated by subtracting 225 kbps, and user 408's downlink capacity is updated by subtracting 225 kbps. FIG. 4I presents the status of the participants after the second iteration of the iterative sequence of lines 205-237 of FIG. 2.

FIG. 4J illustrates the start of a third iteration of the iterative sequence of lines 205-237 of FIG. 2. In this third iteration, user 406 is selected as the sender participant being processed, as user 406 has the third lowest uplink capacity of the four users, and users 402, 404, and 408 are each subscriber participants that are subscribed to user 406. Once again, reserved downlinks are determined for each subscriber participant with respect to the sender participant, which is user 406 in this iteration, according to the embodiment implemented in pseudocode 300 of FIG. 3. User 402 has requested a standard definition video stream from the sender participant, i.e., user 406. As such, user 402's reserved downlink is calculated as user 402's remaining downlink capacity (134 kbps) divided by the number of user 402's subscriptions remaining to be processed. User 402 now has two subscriptions remaining to be processed (users 406 and 408), so user 402's reserved downlink is 134 kbps/2=67 kbps. User 404 has requested a low definition video stream from user 406. User 404 does not have any high definition subscriptions remaining to be processed. As such, user 404's reserved downlink is calculated as user 404's remaining downlink capacity (150 kbps) divided by the number of user 404's subscriptions remaining to be processed. User 404 has two subscriptions remaining to be processed (users 406 and 408). As such, user 404's reserved downlink is 150 kbps/2=75 kbps. User 408 has requested a low definition video stream from user 406. User 408 does not have a high definition subscription remaining to be processed. Therefore, user 408's reserved downlink is equal to user 408's remaining downlink capacity divided by the number of user 408's subscriptions remaining to be processed. User 408 has only one subscription remaining to be processed (user 406). Therefore, user 408's reserved downlink is 625 kbps/1=625 kbps.

FIG. 4K illustrates further processing of the subscriber participants. Per line 212 of FIG. 2, each subscriber participant is ranked in ascending order based on reserved downlink. Per the second iterative sequence implemented in lines

215-236 of FIG. 2, each subscriber participant is processed sequentially based on the ranking. A first iteration of the second iterative sequence processes user 402, who has the lowest reserved downlink. A first video stream layer having a size equal to user 402's reserved downlink (67 kbps) is created, and user 402 is assigned to the first video stream layer. This indicates that the sender participant, user 406, will upload a first video stream layer having a bitrate of 67 kbps. As such, user 406 has 67 kbps of his or her uplink capacity dedicated to the first video stream layer, and 283 kbps of uplink capacity remaining.

A second iteration of the second iterative sequence processes user 404, who has the second lowest reserved downlink. A determination is made that user 404's reserved downlink does not satisfy the difference threshold with respect to the previous video stream layer, i.e., is not at least twice the bitrate of the previous video stream layer. As such, user 404 is assigned to the previously created first video stream layer having a bitrate of 67 kbps.

A third iteration of the second iterative sequence processes user 408, who has the third lowest reserved downlink. User 406's remaining uplink capacity is less than user 408's reserved downlink. As such, the size of a potential new layer is set equal to user 406's remaining uplink capacity, i.e., 283 kbps. The size of the potential new layer satisfies the difference threshold, i.e., is at least twice the bitrate of the previous video stream layer. Therefore, a new, second video stream layer is created having a bitrate of 283 kbps. User 408 is assigned to the second video stream layer.

FIG. 4L summarizes the results of the third iteration of the iterative sequence of lines 205-237 of FIG. 2. User 406 has been assigned to upload two video stream layers, a first video stream layer having a bitrate of 67 kbps and a second video stream layer having a bitrate of 283 kbps. User 406's uplink capacity is updated by subtracting the bitrates of the two video stream layers that user 406 will upload, resulting in a remaining uplink capacity of 0 kbps. Users 402 and 404 are both assigned to receive the first video stream layer from user 406, and user 408 is assigned to receive the second video stream layer from user 406. User 402's downlink capacity is updated by subtracting 67 kbps, user 404's downlink capacity is updated by subtracting 67 kbps, and user 408's downlink capacity is updated by subtracting 283 kbps. FIG. 4M presents the status of the participants after the third iteration of the iterative sequence of lines 205-237 of FIG. 2.

FIG. 4N illustrates the start of a fourth and final iteration of the iterative sequence of lines 205-237 of FIG. 2. In this fourth iteration, user 408 is selected as the sender participant being processed, and users 402, 404, and 406 are each subscriber participants that are subscribed to user 408. Once again, reserved downlinks are determined for each subscriber participant with respect to the sender participant according to the embodiment implemented in pseudocode 300 of FIG. 3. User 402 has requested a standard definition video stream from the sender participant, i.e., user 408. As such, user 402's reserved downlink is calculated as user 402's remaining downlink capacity (67 kbps) divided by the number of user 402's subscriptions remaining to be processed. User 402 now has only one subscription remaining to be processed (user 408), so user 402's reserved downlink is 67 kbps/1=67 kbps. User 404 has requested a low definition video stream from user 408. User 404 does not have any high definition subscriptions remaining to be processed. As such, user 404's reserved downlink is calculated as user 404's remaining downlink capacity (83 kbps) divided by the number of user 404's subscriptions remaining to be processed. User 404 has only one subscription remaining to be processed (user 408). As such, user 404's reserved downlink is 83 kbps/1=83 kbps. User 406 has requested a standard definition video stream from user 408. Therefore, user 406's reserved downlink is equal to user 406's remaining downlink capacity divided by the number of user 406's subscriptions remaining to be processed. User 406 has only one subscription remaining to be processed (user 408). Therefore, user 406's reserved downlink is 225 kbps/1=225 kbps.

FIG. 4O illustrates further processing of the subscriber participants. Per line 212 of FIG. 2, each subscriber participant is ranked in ascending order based on reserved downlink. Per the second iterative sequence implemented in lines 215-236 of FIG. 2, each subscriber participant is processed sequentially based on the ranking. A first iteration of the second iterative sequence processes user 402, who has the lowest reserved downlink. A first video stream layer having a size equal to user 402's reserved downlink (67 kbps) is created, and user 402 is assigned to the first video stream layer. User 408 has 67 kbps of his or her uplink capacity dedicated to the first video stream layer, and 733 kbps of uplink capacity remaining.

A second iteration of the second iterative sequence processes user 404, who has the second lowest reserved downlink. A determination is made that user 404's reserved downlink does not satisfy the difference threshold with respect to the previous video stream layer, i.e., is not at least twice the bitrate of the previous video stream layer. As such, user 404 is assigned to the previously created first video stream layer of 67 kbps.

A third iteration of the second iterative sequence processes user 406, who has the third lowest reserved downlink. User 406's reserved downlink (225 kbps) is less than user 408's remaining uplink capacity (733 kbps). As such, the size of a potential new layer is set equal to user 406's reserved downlink, i.e., 225 kbps. The size of the potential new layer satisfies the difference threshold, i.e., is at least twice the bitrate of the previous video stream layer. Therefore, a new second video stream layer is created having a bitrate of 225 kbps. User 406 is assigned to the second video stream layer.

FIG. 4P summarizes the results of the fourth iteration of the iterative sequence of lines 205-237 of FIG. 2. User 408 has been assigned to upload two video stream layers, a first video stream layer having a bitrate of 67 kbps and a second video stream layer having a bitrate of 225 kbps. User 408's uplink capacity is updated by subtracting the bitrates of the two video stream layers that user 408 will upload, resulting in a remaining uplink capacity of 508 kbps. Users 402 and 404 are both assigned to receive the first video stream layer from user 408, and user 406 is assigned to receive the second video stream layer from user 408. User 402's downlink capacity is updated by subtracting 67 kbps, user 404's downlink capacity is updated by subtracting 67 kbps, and user 406's downlink capacity is updated by subtracting 225 kbps. FIG. 4Q presents the status of the participants after the fourth and final iteration of the iterative sequence of lines 205-237 of FIG. 2. As can be seen, each sender participant (in this case, each participant) has been assigned one or more video stream layers that the participant will upload, and each subscriber participant (in this case, each participant) has been assigned to receive one video stream having a particular bitrate from each sender participant that the subscriber participant is subscribed to.

While the example scenario described above describes an example scenario in which every participant in the group video call is both a sender participant and a subscriber participant, it should be appreciated that the present disclosure is capable of processing and managing group video calls having differing characteristics. For example, a subset of participants may be sender participants, such that only some participants are uploading video streams, and/or a subset of participants may be subscriber participants, such that only some participants are receiving video streams from other participants. Similarly, while the example scenario described above described an example scenario in which every participant receives a video stream from every other participant, it should be appreciated that the present disclosure can address differing scenarios. For example, certain subscriber participants may only be subscribed to receive video feeds from a subset of sender participants. Many variations are possible.

The example embodiments described above have generally attempted to utilize as much of a sender participant's uplink capacity and as much of a subscriber participant's downlink capacity as possible. However, in certain scenarios, it may be desirable to impose limits or caps on bitrates even if additional uplink capacity and/or downlink capacity is available. For example, if a subscriber participant has requested a low definition video stream from a sender participant, it may be desirable to cap the bitrate of the low definition video stream even if the subscriber participant has sufficient downlink capacity and the sender participant has sufficient uplink capacity to accommodate a very high bitrate video stream. As such, in various embodiments, subscriptions of particular quality levels may be capped at a maximum bitrate. For example, a low quality subscription may be capped at a first maximum bitrate, while a standard or medium quality subscription may be capped at a second maximum bitrate that is greater than the first maximum bitrate, while a high quality subscription may be capped at a third maximum bitrate that is greater than the second maximum bitrate, or, in various embodiments, may not be capped at all.

FIG. 5 illustrates an example method 500 associated with optimizing group video call simulcast streams, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can identify a set of participants in a group video call, wherein each participant is associated with an uplink capacity and a downlink capacity, and the set of participants includes a set of sender participants and a set of subscriber participants. At block 504, the example method 500 can, for each sender participant of the set of sender participants, determine one or more video stream layers to be uploaded by the sender participant based on downlink capacities of subscriber participants subscribed to the sender participant. At block 506, the example method 500 can, for each subscriber participant of the set of subscriber participants, assign the subscriber participant to receive one video stream layer of the one or more video stream layers to be uploaded by each sender participant to which the subscriber participant is subscribed.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
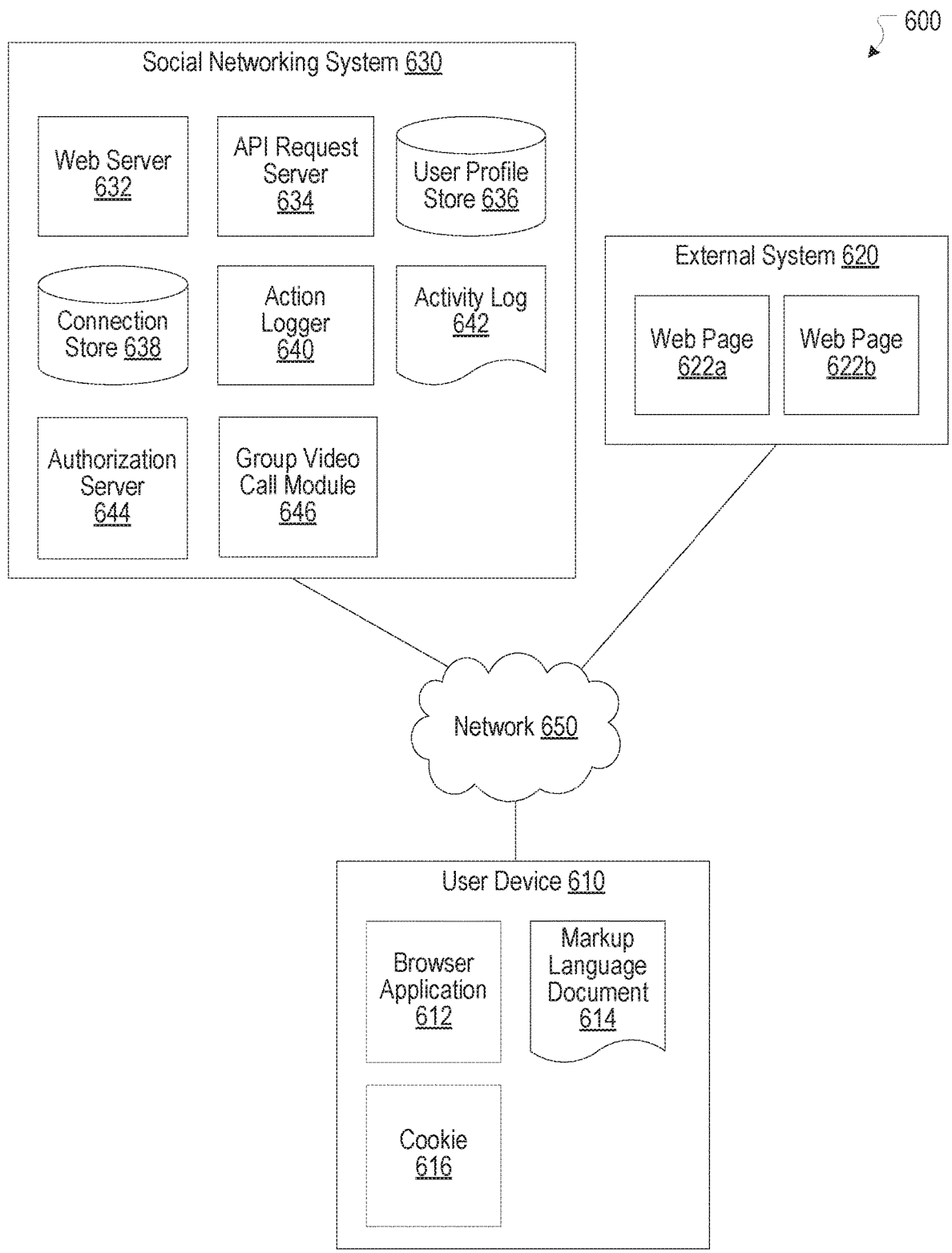
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a group video call module 646. The group video call module 646 can, for example, be implemented as the group video call module 102, as discussed in more detail herein. As discussed previously, it should be appreciated that there can be many variations or other possibilities. For example, in some embodiments, one or more functionalities of the group video call module 646 can be implemented in the user device 610. As discussed previously, it should be appreciated that there can be many variations or other possibilities.

Hardware Implementation

Figure 7:
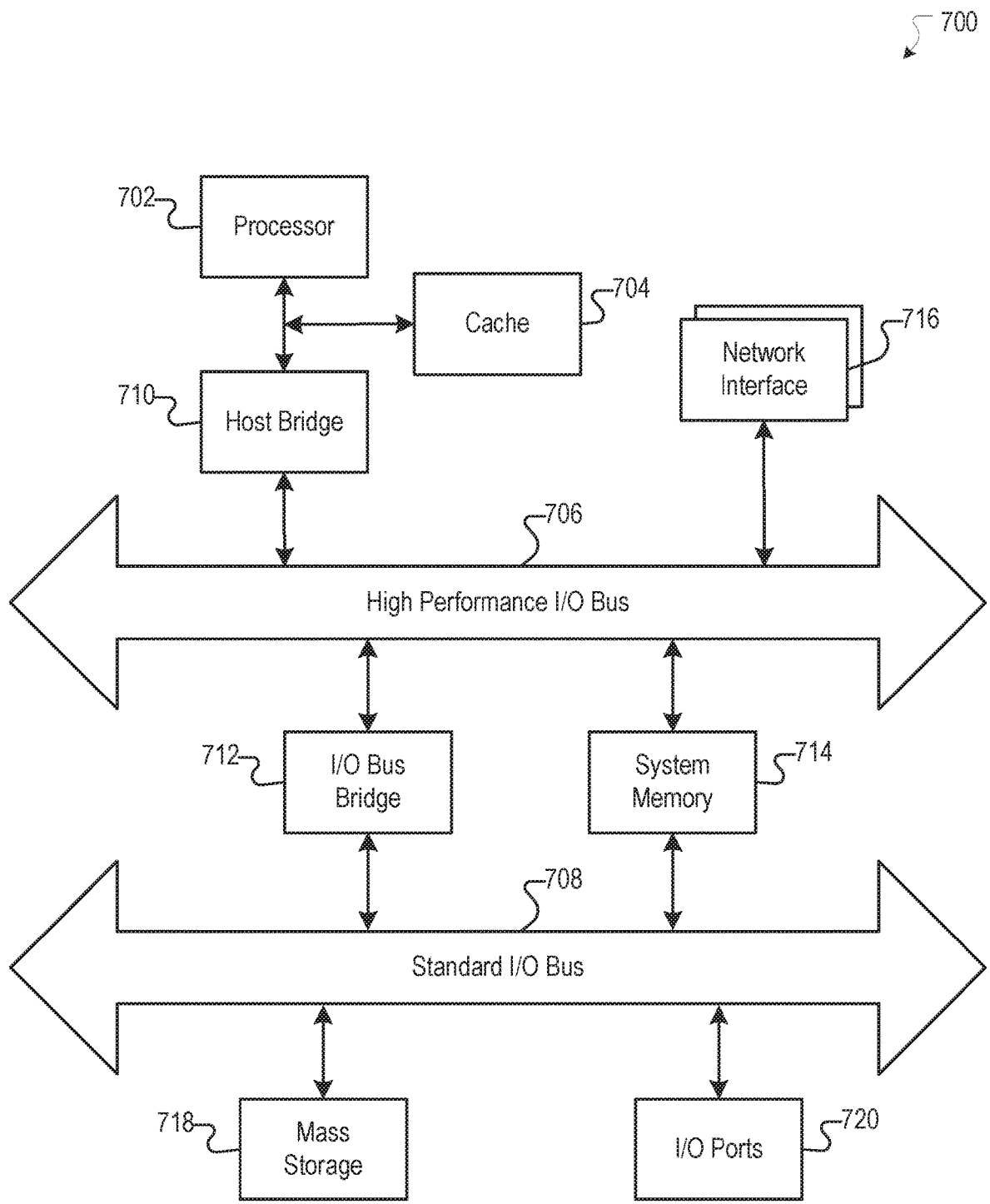
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, by a computing system, a set of participants in a group video call, wherein each participant is associated with an uplink capacity and a downlink capacity, and the set of participants includes a set of sender participants;
   ranking, by the computing system, the set of sender participants based on uplink capacities for the set of sender participants; and
   sequentially processing, by the computing system, the set of sender participants in an order based on the ranking to determine, for each sender participant of the set of sender participants, one or more video stream layers to be uploaded by the sender participant.

2. The computer-implemented method of claim 1, wherein the set of participants includes a set of subscriber participants.

3. The computer-implemented method of claim 2, further comprising: for each subscriber participant of the set of subscriber participants, assigning the subscriber participant to receive at least one video stream layer from at least one sender participant of the set of sender participants.

4. The computer-implemented method of claim 3, wherein each video stream layer to be uploaded by a sender participant of the set of sender participants is associated with a bitrate.

5. The computer-implemented method of claim 4, wherein the bitrate for each video stream layer to be uploaded by each sender participant of the set of sender participants is determined based on downlink capacities of subscriber participants subscribed to the sender participant.

6. The computer-implemented method of claim 4, wherein the bitrate for each video stream layer to be uploaded by each sender participant of the set of sender participants is determined based on downlink capacities of subscriber participants subscribed to the sender participant and the uplink capacity of the sender participant.

7. The computer-implemented method of claim 3, wherein the sequentially processing the set of sender participants comprises:
   for a first sender participant of the set of sender participants, identifying, from the set of subscriber participants, one or more subscriber participants subscribed to the first sender participant,
      ranking the one or more subscriber participants subscribed to the first sender participant, and
      sequentially processing the one or more subscriber participants subscribed to the first sender participant in an order based on the ranking to assign, for each subscriber participant of the one or more subscriber participants subscribed to the first sender participant, the subscriber participant to one video stream layer to be uploaded by the first sender participant.

8. The computer-implemented method of claim 7, wherein the one or more subscriber participants subscribed to the first sender participant are ranked based on downlink capacities.

9. The computer-implemented method of claim 8, wherein the one or more subscriber participants subscribed to the first sender participant are ranked in ascending order based on downlink capacities.

10. The computer-implemented method of claim 7, wherein the sequentially processing the one or more subscriber participants subscribed to the first sender participant comprises, for each subscriber participant of the one or more subscriber participants subscribed to the first sender participant, determining whether to create a new layer to be uploaded by the first sender participant or assigning the subscriber participant to a previously created layer associated with the first sender participant.

11. A system comprising:
at least one processor; and
a memory storing instructions that, when executed by the at least one processor, cause the system to perform a method comprising:
identifying a set of participants in a group video call, wherein each participant is associated with an uplink capacity and a downlink capacity, and the set of participants includes a set of sender participants;
ranking the set of sender participants based on uplink capacities for the set of sender participants; and
sequentially processing the set of sender participants in an order based on the ranking to determine, for each sender participant of the set of sender participants, one or more video stream layers to be uploaded by the sender participant.

12. The system of claim 11, wherein the set of participants includes a set of subscriber participants.

13. The system of claim 12, wherein the instructions, when executed by the at least one processor, further cause the system to perform: for each subscriber participant of the set of subscriber participants, assigning the subscriber participant to receive at least one video stream layer from at least one sender participant of the set of sender participants.

14. The system of claim 13, wherein each video stream layer to be uploaded by a sender participant of the set of sender participants is associated with a bitrate.

15. The system of claim 14, wherein the bitrate for each video stream layer to be uploaded by each sender participant of the set of sender participants is determined based on downlink capacities of subscriber participants subscribed to the sender participant.

16. A non-transitory computer-readable storage medium including instructions that, when executed by at least one processor of a computing system, cause the computing system to perform a method comprising:
identifying a set of participants in a group video call, wherein each participant is associated with an uplink capacity and a downlink capacity, and the set of participants includes a set of sender participants;
ranking the set of sender participants based on uplink capacities for the set of sender participants; and
sequentially processing the set of sender participants in an order based on the ranking to determine, for each sender participant of the set of sender participants, one or more video stream layers to be uploaded by the sender participant.

17. The non-transitory computer-readable storage medium of claim 16, wherein the set of participants includes a set of subscriber participants.

18. The non-transitory computer-readable storage medium of claim 17, wherein the instructions, when executed by at least one processor of a computing system, further cause the computing system to perform: for each subscriber participant of the set of subscriber participants, assigning the subscriber participant to receive at least one video stream layer from at least one sender participant of the set of sender participants.

19. The non-transitory computer-readable storage medium of claim 18, wherein each video stream layer to be uploaded by a sender participant of the set of sender participants is associated with a bitrate.

20. The non-transitory computer-readable storage medium of claim 19, wherein the bitrate for each video stream layer to be uploaded by each sender participant of the set of sender participants is determined based on downlink capacities of subscriber participants subscribed to the sender participant.

* * * * *